(12) United States Patent
Uchiyama et al.

(10) Patent No.: US 7,978,388 B2
(45) Date of Patent: Jul. 12, 2011

(54) MIRROR DEVICE AND MIRROR DEVICE MANUFACTURING METHOD INCORPORATING A COLLISION PREVENTIVE STRUCTURE

(75) Inventors: Shingo Uchiyama, Kanagawa (JP);
Fusao Shimokawa, Kanagawa (JP);
Johji Yamaguchi, Kanagawa (JP);
Kunihiko Sasakura, Kanagawa (JP);
Hiromu Ishii, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 245 days.

(21) Appl. No.: 12/086,222

(22) PCT Filed: Dec. 27, 2006

(86) PCT No.: PCT/JP2006/326051
§ 371 (c)(1),
(2), (4) Date: Jun. 5, 2008

(87) PCT Pub. No.: WO2007/080789
PCT Pub. Date: Jul. 19, 2007

(65) Prior Publication Data
US 2009/0244676 A1   Oct. 1, 2009

(30) Foreign Application Priority Data

Jan. 12, 2006 (JP) .................. 2006-004543
Mar. 16, 2006 (JP) .................. 2006-072216

(51) Int. Cl.
*G02B 26/10* (2006.01)

(52) U.S. Cl. .................. 359/199.2; 359/202.1

(58) Field of Classification Search .............. 359/196.1, 359/197.1, 198.1, 199.1, 199.2, 212.1, 213.1, 359/214.1, 221.2, 847, 849, 850, 855, 904
See application file for complete search history.

(56) References Cited

U.S. PATENT DOCUMENTS

| | | | |
|---|---|---|---|
| 6,259,548 B1 * | 7/2001 | Tsugai et al. .............. 359/224.1 |
| 6,262,827 B1 * | 7/2001 | Ueda et al. ................. 359/224.1 |
| 6,356,689 B1 | 3/2002 | Greywall | |
| 6,768,571 B2 * | 7/2004 | Azarov et al. ................. 359/239 |
| 6,850,354 B2 * | 2/2005 | Greywall .................. 359/291 |

(Continued)

FOREIGN PATENT DOCUMENTS

JP    6-051231 A    2/1994

(Continued)

OTHER PUBLICATIONS

Yamaguchi et al., "Characteristics and Control of MEMS Mirrors for Optical Cross-Connect Switch", MIPE 2003.

(Continued)

*Primary Examiner* — Frank G Font
(74) *Attorney, Agent, or Firm* — Blakely, Sokoloff, Taylor & Zafman

(57) ABSTRACT

When a mirror (230) rotates with a maximum angle, a distance from the rotation center of the mirror (230) to the edge of the mirror (230) along a direction horizontal to an electrode substrate (300) is larger than a distance from a perpendicular, perpendicular to the horizontal direction and extending through the rotation center, to the distal end of an electrode (340a-340d) along the horizontal direction. Even when the mirror (230) rotates to come into contact with the electrode substrate (300), since the electrode (340a-340d) does not exist at a position with which the mirror (230) comes into contact when rotating, the mirror (230) and the electrode (340a-340d) can be prevented from being electrodeposited.

16 Claims, 18 Drawing Sheets

U.S. PATENT DOCUMENTS

| | | | |
|---|---|---|---|
| 6,888,470 B2 * | 5/2005 | Haueis | 340/686.1 |
| 7,092,140 B2 * | 8/2006 | Pan et al. | 359/290 |
| 7,355,781 B2 * | 4/2008 | Mohn | 359/291 |
| 7,468,829 B2 * | 12/2008 | Ogikubo et al. | 359/290 |
| 2005/0128609 A1 | 6/2005 | Shimada et al. | |
| 2005/0134951 A1 | 6/2005 | Mi et al. | |

FOREIGN PATENT DOCUMENTS

| | | |
|---|---|---|
| JP | 6-281869 A | 10/1994 |
| JP | 2000-131630 A | 5/2000 |
| JP | 2001-013443 A | 1/2001 |
| JP | 2002-287045 A | 10/2002 |
| JP | 2003-057575 A | 2/2003 |
| JP | 2003-315701 A | 11/2003 |
| JP | 2004-177436 A | 6/2004 |

OTHER PUBLICATIONS

Ishii et al., "Fabrication of Optical MEMS Switch Having Multilevel Mirror-Drive Electrodes", IEEE 2003, pp. 121-122.

Ishii et al., "Fabrication of Optical Mucroelectromechanical-System Switches Having Multilevel Mirror-Drive Electrodes", Japanese Journal of Applied Physics, vol. 43, No. 9A, 2004, pp. 6468-6472.

* cited by examiner

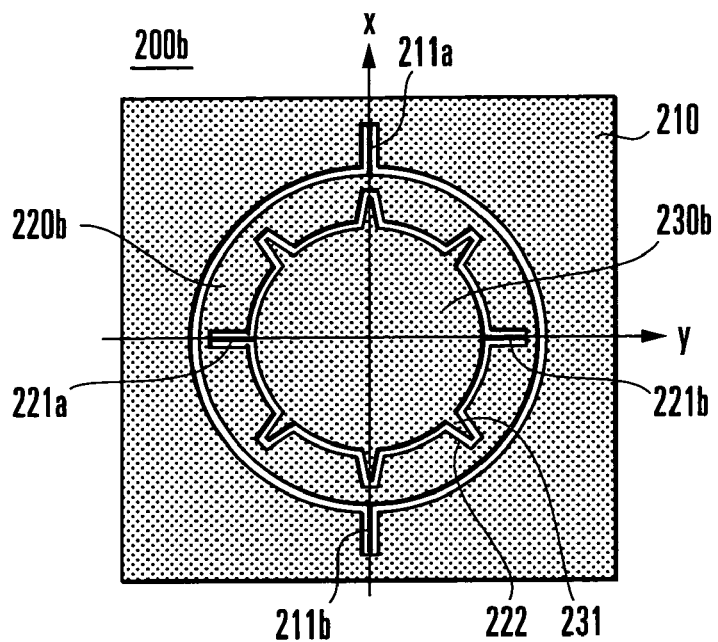
F I G. 11
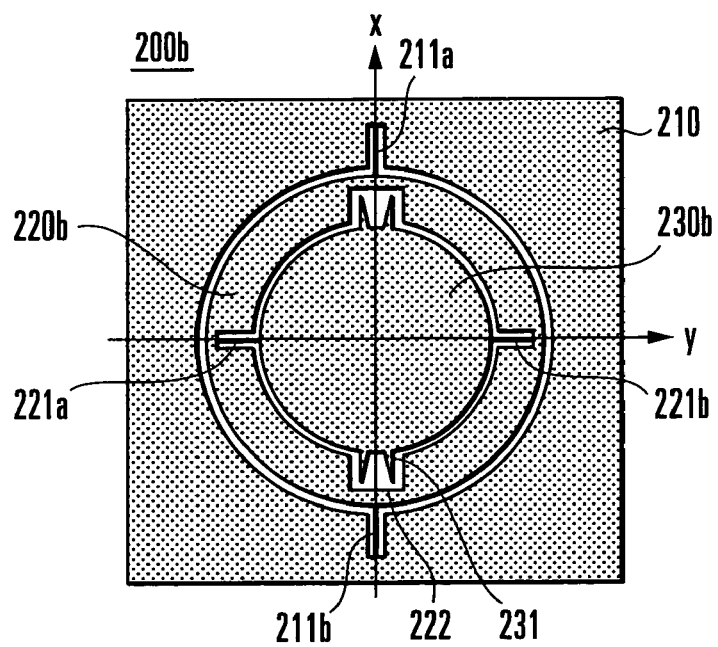
F I G. 12 ns gimbal 820. The gimbal 820 can rotate about a gimbal rotation axis x extending through the pair of gimbal connectors 811a and 811b in FIG. 28.

MIRROR DEVICE AND MIRROR DEVICE MANUFACTURING METHOD INCORPORATING A COLLISION PREVENTIVE STRUCTURE

This is a non-provisional application claiming the benefit of International application number PCT/JP2006/326051 filed Dec. 27, 2006.

TECHNICAL FIELD

The present invention relates to a mirror device applicable to an optical switching element for communication, a measurement device, a display, a scanner, a wavelength selection switch, and the like, and a manufacturing method for the same.

BACKGROUND ART

In the field of the optical network serving as the base in the Internet communication network and the like, the optical MEMS (Micro Electro Mechanical System) technique attracts attention as a technique that realizes a multichannel, wavelength division multiplex (WDM), low-cost system, and an optical switch has been developed using this technique (for example, see Japanese Patent Laid-Open No. 2003-57575). One of the most characteristic constituent components of the MEMS type optical switch is a mirror array. The optical switch enables line switching without converting light into an electrical signal or demultiplexing multiplexed light by wavelength division demultiplex. When a trouble occurs in a line in use, the optical switch is used to distribute the signal to another line, so that the communication state is maintained.

In the mirror array, a plurality of mirrors are arranged two-dimensionally to form a matrix. The mirror array comprises a mirror substrate and an electrode substrate arranged to oppose it. The mirror substrate has a plurality of movable structures serving as mirrors, and a support member which supports the movable structures rotatably by spring members such as torsion springs. The electrode substrate is obtained by forming a plurality of electrode portions corresponding to the movable structures serving as the mirrors on a substrate serving as the base.

FIGS. 28 and 29 show an example of a conventional mirror device. A mirror device 700 has a structure in which a mirror substrate 800 having a mirror and an electrode substrate 900 having electrodes are disposed parallel to each other.

The mirror substrate 800 has a plate-like frame portion 810 having an opening which is almost circular when seen from the top, a gimbal 820 having an opening which is almost circular when seen from the top and disposed in the opening of the frame portion 810 by a pair of gimbal connectors 811a and 811b, and a mirror 830 which is disposed in the opening of the gimbal 820 by a pair of mirror connectors 821a and 821b and is almost circular when seen from the top. The frame portion 810, gimbal connectors 811a and 811b, gimbal 820, mirror connectors 821a and 821b, and mirror 830 are integrally formed of, e.g., single-crystal silicon. A frame-like member 840 surrounding the gimbal 820 and mirror 830 is formed on the upper surface of the frame portion 810. The frame-like member 840 is fixed to the frame portion 810 through an insulating layer 850.

The pair of gimbal connectors 811a and 811b respectively comprise torsion springs and are formed in the notches of the frame portion 810 to connect the frame portion 810 to the gimbal 820. The gimbal 820 can rotate about a gimbal rotation axis x extending through the pair of gimbal connectors 811a and 811b in FIG. 28.

Similarly, the pair of mirror connectors 821a and 821b respectively are formed in the notches of the gimbal 820 and comprise torsion springs to connect the gimbal 820 to the mirror 830. The mirror 830 can rotate about a mirror rotation axis y extending through the pair of mirror connectors 821a and 821b in FIG. 28. The gimbal rotation axis x and mirror rotation axis y are orthogonal. Consequently, the mirror 830 rotates about two orthogonal axes.

The electrode substrate 900 has a plate-like base 910, and a terraced projection 920 projecting from the surface (upper surface) of the base 910 and formed at a position to oppose the mirror 830 of the opposing mirror substrate 800. The base 910 and projection 920 are made of, e.g., single-crystal silicon. The projection 920 comprises a prismoidal second terrace 922 formed on the upper surface of the base 910, a prismoidal first terrace 921 formed on the upper surface of the second terrace 922, and a columnar pivot 930 formed on the upper surface of the first terrace 921. The pivot 930 is formed almost at the center of the first terrace 921. Thus, the pivot 930 is disposed at a position opposing the center of the mirror 830.

Four electrodes 940a to 940d are formed on the four corners of the projection 920 and the upper surface of the base 910 continuous to the four corners to fall within a circle concentric with the mirror 830 of the opposing mirror substrate 800. A pair of protrusions 960a and 960b which line up to sandwich the projection 920 are formed on the upper surface of the base 910. Furthermore, interconnections 970 are formed between the projection 920 and protrusion 960a and between the projection 920 and protrusion 960b on the upper surface of the base 910. The interconnections 970 are connected to the electrodes 940a to 940d through lines 941a to 941b.

The mirror substrate 800 and electrode substrate 900 as described above form a mirror device 700 as shown in FIG. 29 as the lower surface of the frame portion 810 is bonded to the upper surfaces of the protrusions 960a and 960b such that the mirror 830 opposes the electrodes 940a to 940d that oppose it.

In the mirror device 700, the mirror 830 is grounded, and positive voltages are applied to the electrodes 940a to 940d while forming asymmetric potential differences among the electrodes 940a to 940d, so that the mirror 830 can be attracted by an electrostatic attracting force and rotated in an arbitrary direction.

In the mirror device 700, when applying driving voltages to the electrodes 940a to 940d, the pivot 930 prevents the mirror 830 from being entirely attracted by the electrodes 940a to 940d to be parallel to them to collide against them. The pivot 930 also serves as a fulcrum about which the mirror 830 rotates.

DISCLOSURE OF INVENTION

Problem to be Solved by the Invention

When electrostatic attracting forces generated by the potential differences applied among the four electrodes 940a to 940d balance with the restoration forces of the torsion springs which are to restore the mirror 830 to the relative position for the potential difference of 0 against the electrostatic attracting forces, the mirror 830 stops while maintaining a certain angle. When the potential difference between the mirror 830 and each one of the electrodes 940a to 940d is increased to increase the tilt angle of the mirror 830, the distance between the mirror 830 and the corresponding one of the electrodes 940a to 940d decreases. The electrostatic attracting force generated between the mirror 830 and each of the electrodes 940a to 940d is inversely proportional to the square of the distance between the mirror 830 and the corresponding one of the electrodes 940a to 940d. Hence, when the distance between the mirror 830 and each one of the electrodes 940a to 940d decreases, the resultant electrostatic attracting force increases. The restoration force of the torsion spring against the electrostatic attracting force increases in proportion to the tilt angle of the mirror 830. When the tilt angle of the mirror 830 increases, the electrostatic attracting force no longer balances with the restoration force of the torsion spring. Then, a phenomenon called pull-in occurs, in which the mirror 830 does not stop rotating but keeps rotating until it collides against the electrode substrate 900.

When the mirror 830 collides against one of the electrodes 940a to 940d, if a potential difference is present between the mirror 830 and the corresponding one of the electrodes 940a to 940d, a current flows in a short period of time in an amount limited by the capacity of a power supply that generates the potential difference, and the mirror 830 sticks to the corresponding one of the electrodes 940a to 940d. Once this sticking phenomenon occurs, even when the potential difference is set to 0, the mirror 830 is not restored to the angular position for the potential difference of 0, and the mirror 830 does not operate, that is, the mirror 830 becomes defective. When the mirror 830 becomes defective, even when the voltage is applied to another one of the electrodes 940a to 940d, the mirror 830 stays sticking to the electrode substrate 900 and does not operate. Thus, once a sticking phenomenon occurs, the mirror 830 no longer operates.

The present invention has been made to solve the problem described above, and has as its object to provide a mirror device that can prevent a mirror and an electrode from sticking to each other.

Means of Solution to the Problem

In order to achieve the above object, according to the present invention, there is provided a mirror device characterized by comprising a mirror rotatably supported by an upper substrate, a first electrode which is formed on a lower substrate opposing the upper substrate to be spaced apart therefrom by a predetermined gap, and controls a tilt angle of the mirror, and a collision preventive structure which is provided to the mirror and prevents collision of the mirror with the first electrode when the mirror rotates.

In the mirror device, when the mirror rotates with a maximum angle, a distance from the rotation center of the mirror to the edge of the mirror along a direction horizontal to the lower substrate may be larger than a distance from a perpendicular, perpendicular to the horizontal direction and extending through the rotation center, to the distal end of the first electrode along the horizontal direction. The structure that the distance to the edge of the mirror is larger than the distance to the distal end of the first electrode serves as the collision preventive structure.

In the mirror device, the upper substrate may comprise an SOI substrate comprising a silicon base portion having a mirror formation region, a buried insulating layer formed on the base portion, and a silicon layer formed on the buried insulating layer, and may include a base formed in the mirror formation region and a mirror rotatably connected to the base through a pair of connectors, and a projecting structure formed on the mirror in the silicon layer. This projecting structure serves as the collision preventive structure.

A mirror manufacturing method according to the present invention is a method of manufacturing a mirror device having a mirror rotatably supported with respect to an upper substrate, and a first electrode which is formed on a lower substrate opposing the upper substrate and controls a tilt angle of the mirror, characterized by comprising at least the steps of forming a projecting structure on a surface of a mirror formation region of a silicon layer of an SOI substrate comprising a substrate portion, a buried insulating layer on the substrate portion, and the silicon layer on the buried insulating layer, forming a movable portion formation mask pattern on a surface of the silicon layer, processing the silicon layer by etching using the movable portion formation mask pattern as a mask, and forming a base and a plate-like mirror, connected to the base through a pair of connectors, on the mirror formation region on the buried insulating layer, forming a frame formation mask pattern, having an opening serving as a mirror formation region, on a surface of the substrate portion, removing the substrate portion and the buried insulating layer by etching using the frame formation mask pattern as a mask, to expose the silicon layer on a substrate portion side in the mirror formation region, and forming a frame portion outside the mirror formation region, and forming a reflecting film on a surface of the mirror, which is opposite to a surface where the projecting structure is formed, of the upper substrate where the projecting structure, the mirror and the frame portion are formed.

EFFECTS OF THE INVENTION

According to the present invention, formation of the collision preventive structure can prevent collision of the mirror with the first electrode during rotating, thus preventing the mirror and first electrode from sticking to each other.

Also, according to the present invention, when the mirror rotates with the maximum angle, the distance from the rotation center of the mirror to the edge of the mirror along the direction horizontal to the lower substrate is larger than the distance from the perpendicular, perpendicular to the horizontal direction and extending through the rotation center, to the distal end of the first electrode along the horizontal direction. This can prevent the mirror and electrode from sticking to each other. As a result, during operation of the mirror, even if the mirror is pulled in intentionally or accidentally, the mirror does not stick to the electrode while being in contact with it, so that an increase in number of mirrors that operate defectively can be prevented. Even if vibration is transmitted to the mirror externally, it does not fracture the mirror or cause the mirror to operate defectively. Hence, limitations on the environment where the mirror device is used can be moderated.

According to the present invention, the projecting structure is formed on that surface of the mirror structure which is opposite to a side where the frame portion is formed. Once the projecting structure is formed, in the processing step for the side (a side where the frame portion is formed) opposite to the surface where the projecting structure is formed, the mirror substrate is arranged on the substrate base of the employed apparatus such that that projecting structure forming surface of the mirror substrate opposes the substrate base. As a result, the present invention provides an excellent effect that the mirror device including the mirror substrate can be manufactured such that damages such as fracture do not occur easily.

BRIEF DESCRIPTION OF DRAWINGS

FIG. 11 is a plan view showing still another example of the mirror substrate of the mirror device in FIG. 6;

FIG. 12 is a plan view showing still another example of the mirror substrate of the mirror device in FIG. 6;

BEST MODE FOR CARRYING OUT THE INVENTION

The embodiments of the present invention will be described with reference to the drawings.

First Embodiment

Figure 1:
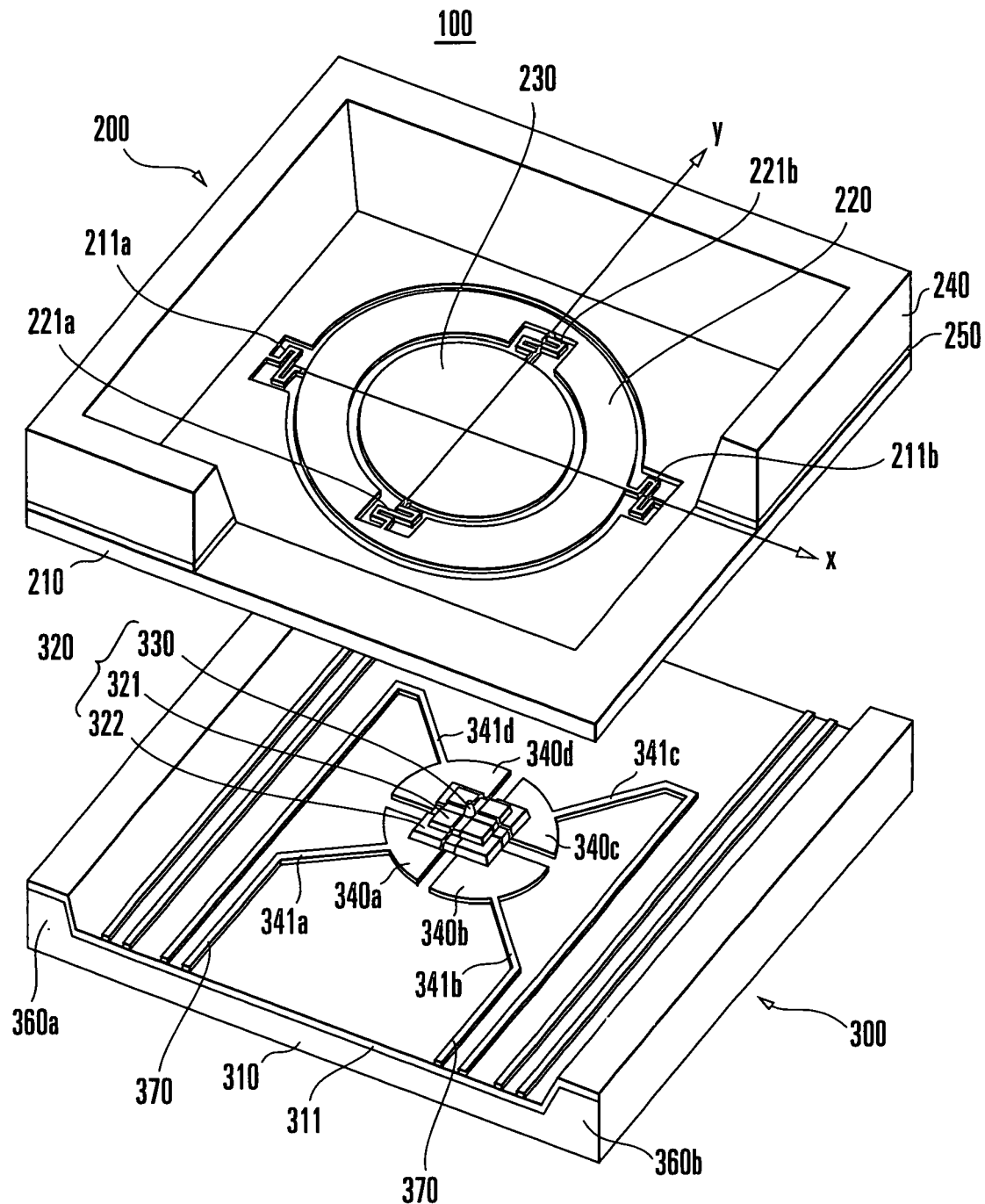
FIG. 1 is an exploded perspective view showing the arrangement of a mirror device according to the first embodiment of the present invention.
Figure 2:
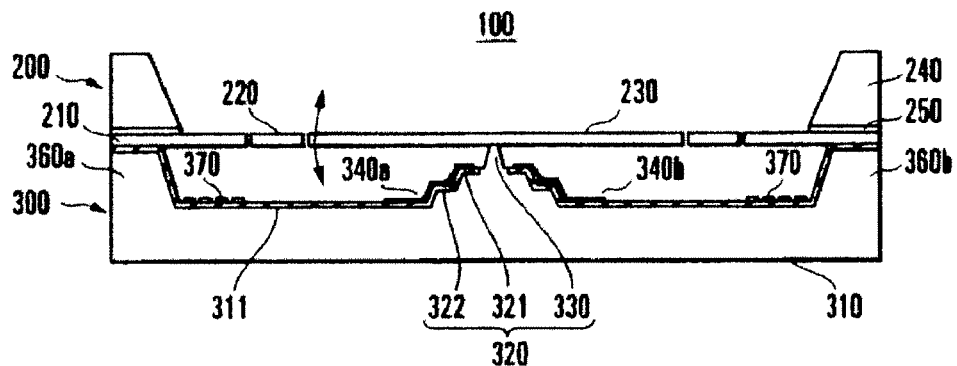
FIG. 2 is a sectional view of the mirror device in FIG. 1.

A mirror device according to the first embodiment of the present invention will be described. As shown in FIGS. 1 and 2, a mirror device 100 of this embodiment has a structure in which a mirror substrate 200 having a mirror and an electrode substrate 300 having electrodes are disposed parallel to each other.

The mirror substrate 200 has a plate-like frame portion 210 having an opening which is almost circular when seen from the top, a gimbal (movable frame) 220 having an opening which is almost circular when seen from the top and disposed in the opening of the frame portion 210 by a pair of gimbal connectors 211a and 211b, and a mirror 230 which is disposed in the opening of the gimbal 220 by a pair of mirror connectors 221a and 221b and is almost circular when seen from the top. The frame portion 210, gimbal connectors 211a and 211b, gimbal 220, mirror connectors 221a and 221b, and mirror 230 are integrally formed of, e.g., single-crystal silicon. A frame-like member 240 surrounding the gimbal 220 and mirror 230 is formed on the upper surface of the frame portion 210. The frame-like member 240 is fixed to the frame portion 210 through an insulating layer 250.

The pair of gimbal connectors 211a and 211b respectively comprise torsion springs and are formed in the notches of the frame portion 210 to connect the frame portion 210 to the gimbal 220. The gimbal 220 can rotate about a gimbal rotation axis x extending through the pair of gimbal connectors 211a and 211b in FIG. 1.

Similarly, the pair of mirror connectors 221a and 221b respectively comprise torsion springs and are formed in the notches of the gimbal 220 to connect the gimbal 220 to the mirror 230. The mirror 230 can rotate about a mirror rotation axis y extending through the pair of mirror connectors 221a and 221b in FIG. 1. The gimbal rotation axis x and mirror rotation axis y are orthogonal. Consequently, the mirror 230 rotates about two orthogonal axes.

The electrode substrate 300 has a plate-like base 310, and a terraced projection 320 projecting from the surface (upper surface) of the base 310 and formed at a position to oppose the mirror 330 of the opposing mirror substrate 200. The base 310 and projection 320 are made of, e.g., single-crystal silicon. The projection 320 comprises a prismoidal second terrace 322 formed on the upper surface of the base 310, a prismoidal first terrace 321 formed on the upper surface of the second terrace 322, and a columnar pivot 330 formed on the upper surface of the first terrace 321. The pivot 330 is formed almost at the center of the first terrace 321. Thus, the pivot 330 is disposed at a position opposing the center of the mirror 230.

Four electrodes 340a to 340d are formed on the four corners of the projection 320 and the upper surface of the base 310 continuous to the four corners to fall within a circle concentric with the mirror 230 of the opposing mirror substrate 200. A pair of protrusions 360a and 360b which line up to sandwich the projection 320 are formed on the upper surface of the base 310. Furthermore, interconnections 370 are formed between the projection 320 and protrusion 360a and between the projection 320 and protrusion 360b on the upper surface of the base 310. The interconnections 370 are connected to the electrodes 340a to 340d through lines 341a to 341b.

The mirror substrate 200 and electrode substrate 300 as described above constitute a mirror device 100 as shown in FIG. 2 as the lower surface of the frame portion 210 is bonded to the upper surfaces of the protrusions 360a and 360b such that the mirror 230 opposes the electrodes 340a to 340d that oppose it.

In the mirror device 100, the mirror 230 is grounded, and positive voltages are applied to the electrodes 340a to 340d while forming asymmetric potential differences among the electrodes 340a to 340d, so that the mirror 230 can be attracted by an electrostatic attracting force and rotated in an arbitrary direction.

In the mirror device 100 as described above, to prevent the mirror 230 and the electrodes 340a to 340d from sticking to each other, the electrodes 340a to 340d should not be arranged at positions that render the mirror 230 to come into contact with the electrode substrate 300 when the mirror 230 rotates. To achieve this, the electrodes 340a to 340d may be arranged at positions closer to the rotation center than the positions that render the mirror 230 to come into contact with the electrode substrate 300 when the mirror 230 rotates. For this purpose, this embodiment satisfies a contact avoiding condition that, when the mirror 230 rotates with a maximum angle, the distance from the rotation center (intersection of the gimbal rotation axis x and mirror rotation axis y in FIG. 1) of the mirror 230 to the edge of the mirror 230 along a direction horizontal to the electrode substrate 300 is larger than the distance from a perpendicular, perpendicular to the horizontal direction and extending through the rotation center, to the distal end of any one of the electrodes 340a to 340d.

Figure 3:
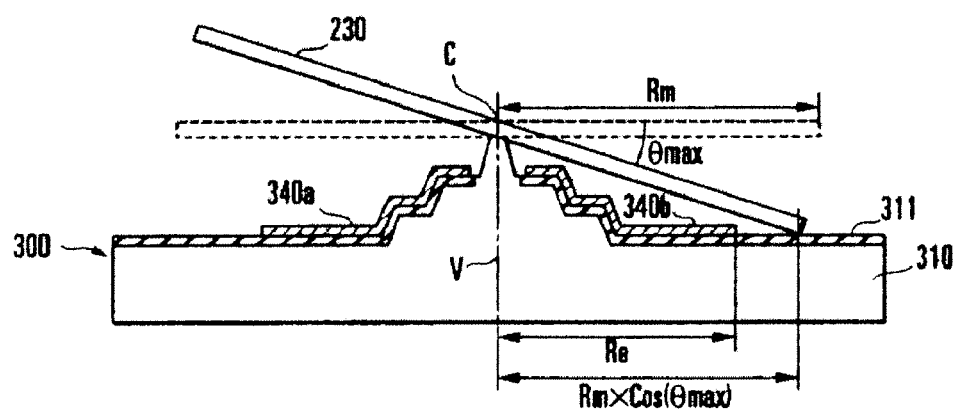
FIG. 3 is a sectional view of the main part showing the arrangement of the mirror device according to the first embodiment of the present invention.

This embodiment is different from the prior art in that the electrodes 340a to 340d are made small, as shown in FIG. 3, to satisfy the above contact avoiding condition. More specifically, the following equation is established:

$$Rm \times \mathrm{Cos}(\theta max) > Re \quad (1)$$

where Rm is the distance from a rotation center C of the mirror 230 to the edge of the mirror 230 when a tilt angle θ of the mirror 230 is 0, Re is the distance from a perpendicular V, perpendicular to the electrode substrate 300 and extending through the rotation center C, to the distal end of any one of the electrodes 340a to 340d along the horizontal direction of the electrode substrate 300, and θmax is the tilt angle of the mirror 230 when the mirror 230 rotates with the maximum angle.

As described with reference to FIGS. 1 and 2, the frame portion 210, gimbal connectors 211a and 211b, gimbal 220, mirror connectors 221a and 221b, and mirror 230 of the mirror substrate 200 are integrally made of single-crystal silicon. A ground potential is applied to the mirror 230 through the frame portion 210, gimbal connectors 211a and 211b, gimbal 220, and mirror connectors 221a and 221b. Positive or negative driving voltages are applied from a power supply (not shown) to the electrodes 340a to 340d to form asymmetric potential differences among the electrodes 340a to 340d, so that the mirror 230 can be attracted by an electrostatic attracting force and rotated in an arbitrary direction.

In the conventional mirror device, when the tilt angle of the mirror 230 increases, the mirror 230 and the electrodes 340a to 340d may undesirably stick to each other. In contrast to this, according to this embodiment, even if the tilt angle of the mirror 230 increases, the mirror 230 comes into contact with the base 310 of the electrode substrate 300 before coming into contact with the electrodes 340a to 340d, and stops moving. Thus, the mirror 230 will not come into contact with the electrodes 340a to 340d. An insulating layer 311 (insulating member) made of silicon oxide or the like is formed on the surface of the base 310 made of single-crystal silicon or the like, and the electrodes 340a to 340d, lines 341a to 341d, and interconnections 370 are formed on the insulating layer 311. Therefore, even if the mirror 230 comes into contact with the base 310, they will not stick to each other.

As described above, according to this embodiment, sticking of the mirror 230 and the electrodes 340a to 340d with each other can be prevented by down-sizing the electrodes 340a to 340d. In this embodiment, as compared to the conventional method of covering the surfaces of the mirror 230 and electrodes 340a to 340d with an insulator, the insulator existing in the space between the mirror 230 and electrode substrate 300 can be reduced. This can decrease the influence that polarization or electrification of the insulator imposes on the force that drives the mirror 230, and can accordingly suppress drift. In this manner, this embodiment provides a solution to the issue of preventing sticking of the mirror and electrode to each other while suppressing drift.

If the alignment accuracy in the step of bonding the mirror substrate 200 and electrode substrate 300 is poor, the mirror 230 may undesirably come into contact with the electrodes 340a to 340d. Thus, considering the alignment accuracy, the following equation may be established:

$$Rm \times \mathrm{Cos}(\theta max) > (Re + D) \quad (2)$$

where D is the shift amount between the mirror substrate 200 and electrode substrate 300 in the horizontal direction which occurs during bonding.

Also, in this embodiment, the sizes of the electrodes 340a to 340d are changed with reference to the size of the mirror 230. Alternatively, the mirror 230 may be enlarged while maintaining a shape similar to the original shape, such that equation (1) or (2) is satisfied.

Second Embodiment

Figure 4:
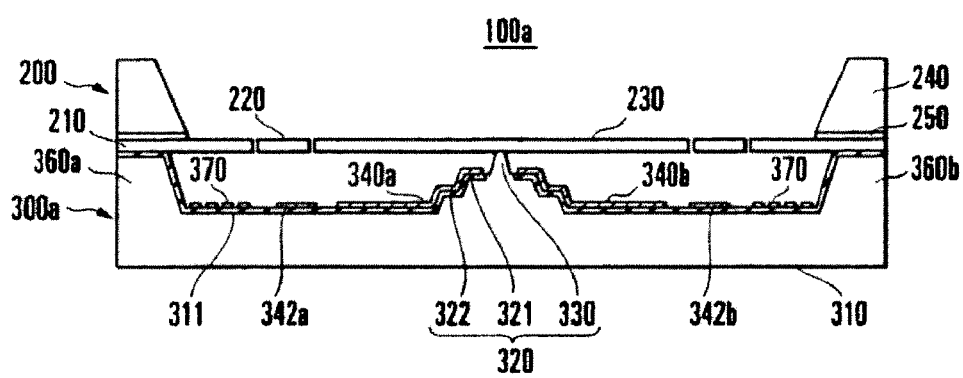
FIG. 4 is a sectional view showing the arrangement of a mirror device according to the second embodiment of the present invention.
Figure 5:
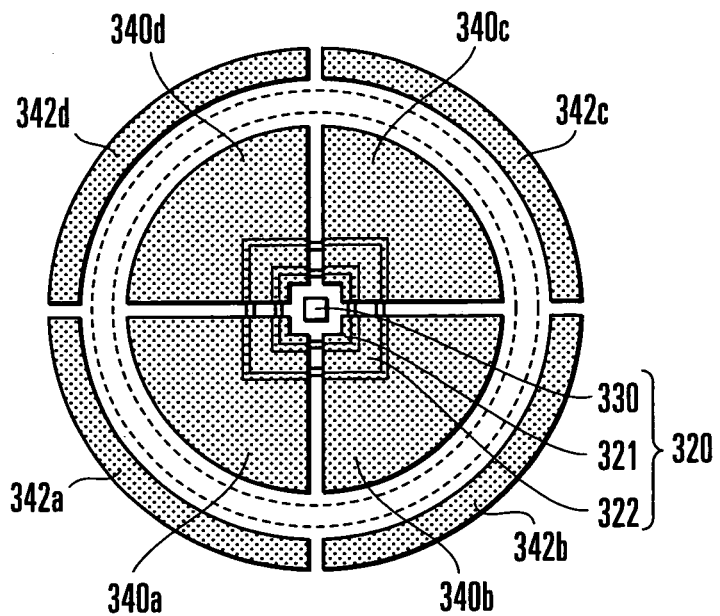
FIG. 5 is a plan view showing the arrangement of the electrode substrate of the mirror device in FIG. 4.

The second embodiment of the present invention will be described with reference to FIGS. 4 and 5. In FIGS. 4 and 5, the same arrangements as those in FIGS. 1 and 2 are denoted by the same reference numerals. FIG. 4 is a sectional view of a mirror device taken along a plane parallel to the gimbal rotation axis x in FIG. 1. FIG. 5 shows only electrodes 340a and 340d and their peripheries.

In a mirror device 100a of this embodiment, electrodes 342a to 342d are disposed at positions farther from the rotation center of a mirror 230 than those positions (in a region surrounded by broken lines in FIG. 5) on an electrode substrate 300a with which a mirror 230 comes into contact when rotating. The electrodes 342a, 342b, 342c, ad 342d are connected to have the same potentials as those of the electrodes 340a, 340b, 340c, and 340d, respectively. This can increase the power to drive the mirror 230 without increasing the driving voltage. Driving voltages applied from a power supply (not shown) to the electrodes 342a, 342b, 342c, and 342d may be separately controlled independently of the driving voltage to be applied to the electrodes 340a, 340b, 340c, and 340d.

Third Embodiment

Figure 6:
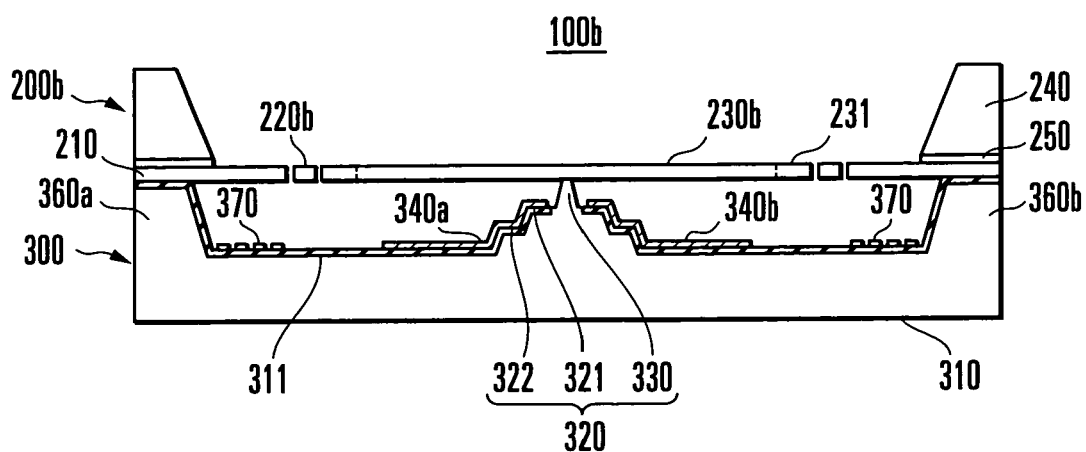
FIG. 6 is a sectional view showing the arrangement of a mirror device according to the third embodiment of the present invention.
Figure 7:
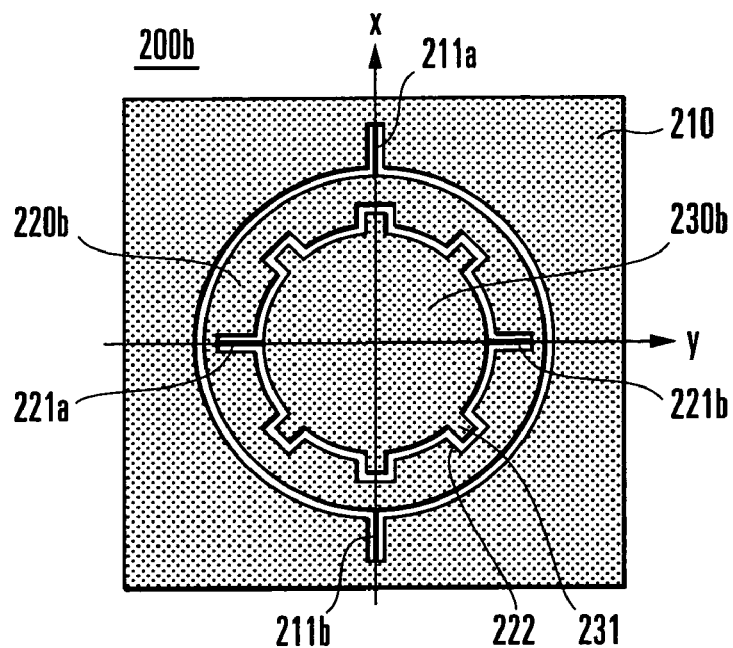
FIG. 7 is a plan view showing the arrangement of the mirror substrate of the mirror device in FIG. 6.
Figure 8:
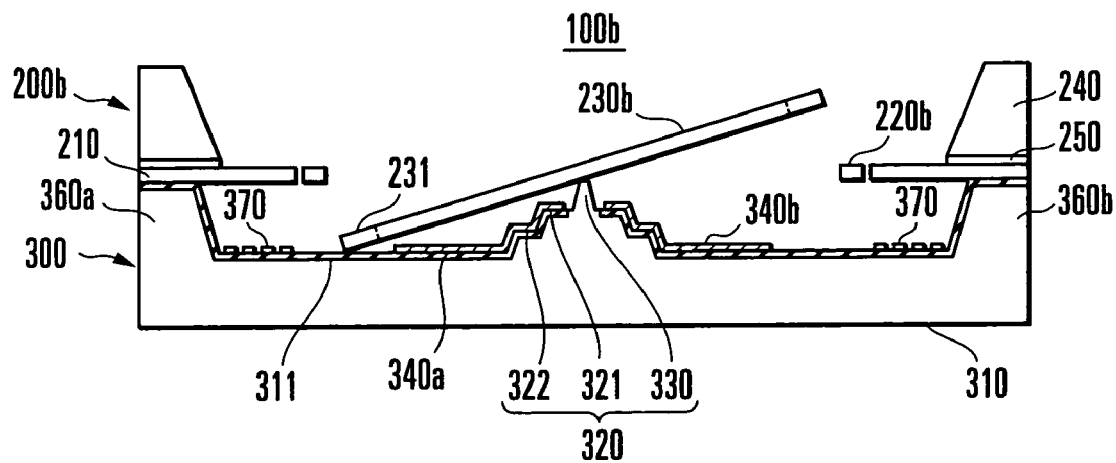
FIG. 8 is a sectional view to explain the effect of the third embodiment of the present invention.

The third embodiment of the present invention will be described with reference to FIGS. 6 to 8. In FIGS. 6 to 8, the same arrangements as those in FIGS. 1 and 2 are denoted by the same reference numerals. FIG. 6 is a sectional view of a mirror device taken along a plane parallel to the gimbal rotation axis x in FIG. 1.

A mirror device 100b of this embodiment has a structure in which a mirror substrate 200b and electrode substrate 300 are disposed parallel to each other. The arrangement of the electrode substrate 300 is the same as that of the mirror device 100 of the first embodiment shown in FIGS. 1 and 2.

A mirror 230b of the mirror substrate 200b of this embodiment has projections 231, extending in the radial direction, at its edge. A gimbal 220b has notches 222 to avoid collision with the projections 231. The projections 231 satisfy the contact avoiding condition described above. More specifically, equation (1) or (2) is established where Rm is the distance from the rotation center of the mirror 230b to the distal end of the projection 231 when a tilt angle θ of the mirror 230b is 0.

In this embodiment, even when the tilt angle of the mirror 230b increases, as shown in FIG. 8, before the mirror 230b comes into contact with one of electrodes 340a to 340d, one projection 231 comes into contact with a base 310 of the electrode substrate 300 to stop movement of the mirror 230b. Thus, the mirror 230b does not come into contact with any one of the electrodes 340a to 340d. The projections 231 are molded monolithically with the mirror 230b, and a ground potential of the same potential as that of the mirror 230b is applied to the projections 231. Since an insulating layer 311 is formed on the surface of the base 310, even if one projection 231 comes into contact with the base 310, they will not stick to each other.

As described above, according to this embodiment, sticking of the mirror 230b and one of the electrodes 340a to 340d to each other can be prevented by forming the projections 231 at the edge of the mirror 230b. In this embodiment, as compared to the conventional method of covering the surfaces of the mirror 230b and electrodes 340a to 340d with an insulator, the insulator existing in the space between the mirror 230b and electrode substrate 300 can be reduced. This can decrease the influence that polarization or electrification of the insulator imposes on the force that drives the mirror 230b, and can accordingly suppress drift.

In this embodiment, since the electrodes 340a to 340d need not be downsized unlike the first embodiment, the mirror 230b can be driven with a lower voltage. Consequently, the driving voltage to be supplied to the electrodes 340a to 340d need not be increased, and a power supply capable of generating high voltage becomes unnecessary. Since the mass of the electrode 340b can be decreased when compared to the first embodiment, the operation speed of the mirror 230b can be increased.

Figure 9:
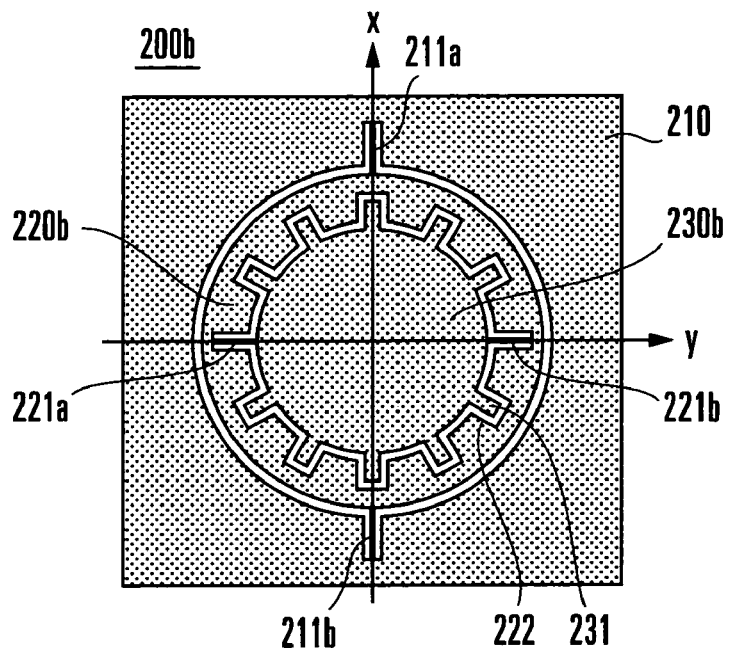
FIG. 9 is a plan view showing another example of the mirror substrate of the mirror device in FIG. 6.
Figure 10:
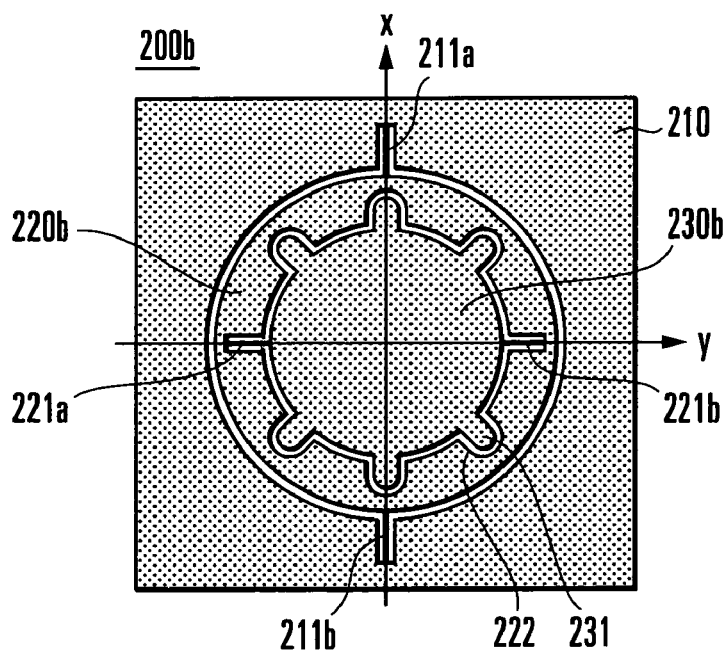
FIG. 10 is a plan view showing still another example of the mirror substrate of the mirror device in FIG. 6.
Figure 13:
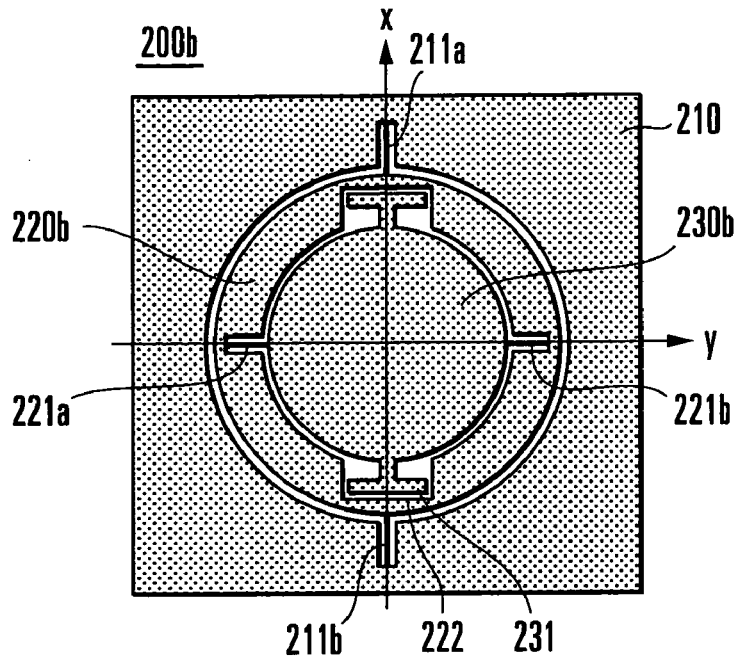
FIG. 13 is a plan view showing still another example of the mirror substrate of the mirror device in FIG. 6.

As the mirror 230b rotates about a mirror rotation axis y, the rotating direction of the mirror 230b intersects the mirror rotation axis y. Hence, in FIGS. 6 and 7, the projections 231 are provided at a total of six locations at the edge of the mirror 230b, i.e., two locations in a direction (the direction of a gimbal rotation axis x) perpendicular to the mirror rotation axis y and four locations in directions each at 45° with respect to the mirror rotation axis y. Note that the shapes and positions of the projections 231 are not limited to this. FIGS. 9 to 13 show other examples of the projections 231. FIG. 9 shows an example in which the number of projections 231 is increased, FIG. 10 shows an example in which the distal ends of the projections 231 are rounded, FIGS. 11 and 12 show examples in which the distal ends of the projections 231 are sharpened, and FIG. 13 shows an example in which T-shaped projections 231 are provided.

Fourth Embodiment

In the first to third embodiments, contact between only the mirror 230 or 230b and the electrodes 340a to 340d is considered. In a two-axis rotation type mirror device, the gimbal 220 or 220b also rotates about the gimbal rotation axis x, and depending on the sizes of the electrodes 340a to 340d, it may come into contact with the electrodes 340a to 340d. The gimbal 220 or 220b has the same potential as that of the mirror 230 or 230b. If the gimbal 220 or 220b undesirably comes into contact with the electrodes 340a to 340d, sticking occurs in the same manner as with the mirror 230 or 230b. Since the insulating layer 311 is formed on the surface of the base 310, no problem occurs when the mirror 230 or 230b comes into contact with the base 310. When, however, the radius of each of the electrodes 340a to 340d is larger than that of the mirror 230 or 230b, the gimbal 220 or 220b may more likely come into contact with the electrodes 340a to 340d.

Figure 14:
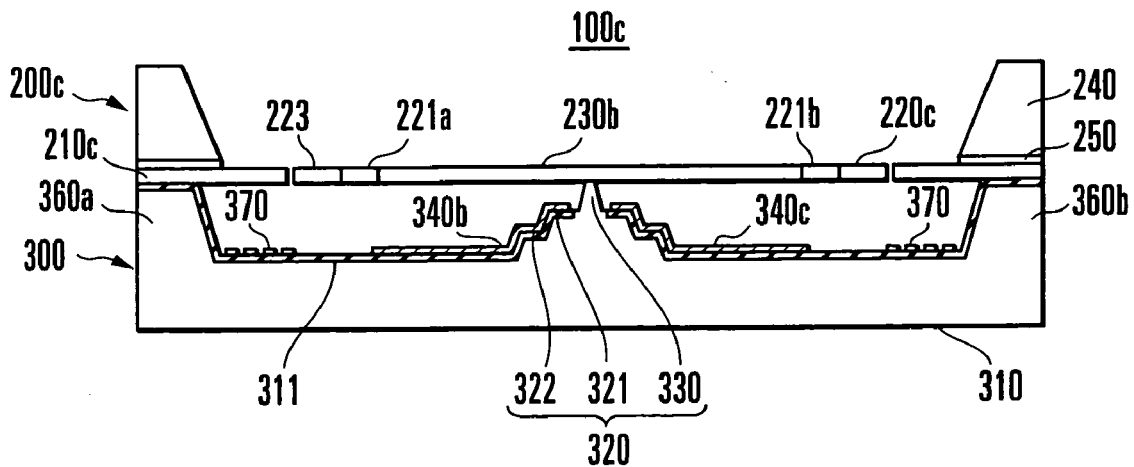
FIG. 14 is a sectional view showing the arrangement of a mirror device according to the fourth embodiment of the present invention.
Figure 15:
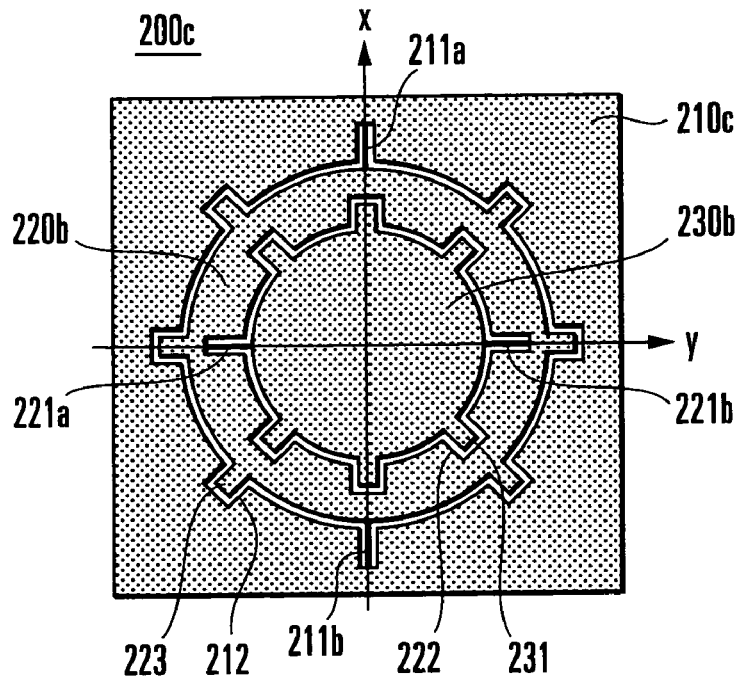
FIG. 15 is a plan view showing the arrangement of the mirror substrate of the mirror device in FIG. 14.
Figure 16:
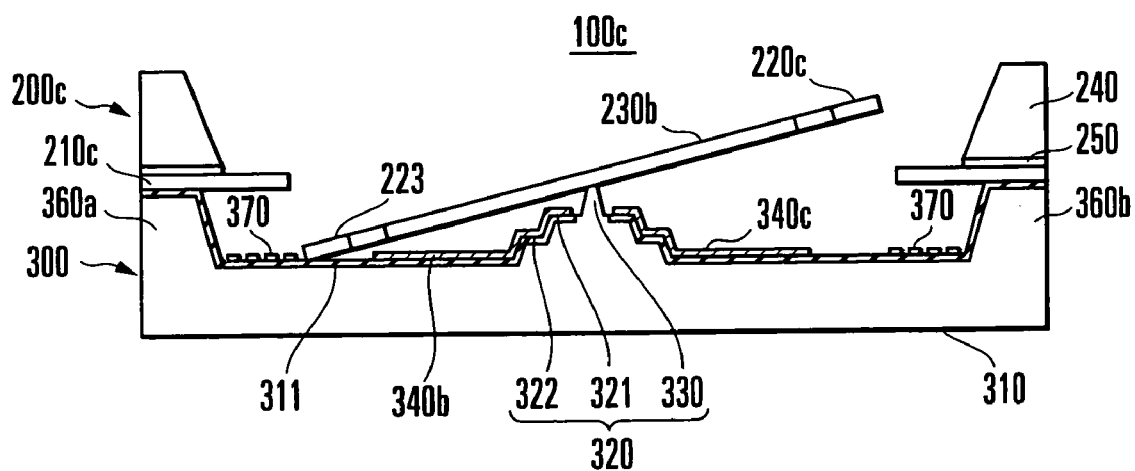
FIG. 16 is a sectional view to explain the effect of the fourth embodiment of the present invention.

In view of this problem, this embodiment adopts the above contact avoiding condition for the gimbal. More specifically, it suffices if equation (1) or (2) is established where Rm is the distance from the rotation center (the intersection of a gimbal rotation axis x and mirror rotation axis y in the same manner as with the mirror) of the gimbal to the edge of the gimbal when the tilt angle of the gimbal is 0. As a practical method that allows such a contact avoiding condition to establish, electrodes 340a to 340d may be downsized with reference to the size of the gimbal, in the same manner as in the first embodiment, or the size of the gimbal may be increased with reference to the sizes of the electrodes 340a to 340d. The gimbal may be provided with projections, in the same manner as in the third embodiment. In the fourth embodiment, a case will be described with reference to FIGS. 14 to 16, in which a gimbal is provided with projections. In FIGS. 14 to 16, the same arrangements as those in FIGS. 1, 2, 6, and 7 are denoted by the same reference numerals. FIG. 14 is a sectional view of a mirror device taken along a plane parallel to the mirror rotation axis y in FIG. 1.

In a mirror device 100c of this embodiment, a gimbal 220c of a mirror substrate 200c has projections 223, extending in the radial direction, at its edge. A frame portion 210c has notches 212 to avoid collision with the projections 223. The projections 223 satisfy the contact avoiding condition described above. More specifically, equation (1) or (2) is established where Rm is the distance from the rotation center of the gimbal 220c to the distal end of each projection 223 when the tilt angle of the gimbal 220c is 0.

In this embodiment, even when the tilt angle of the gimbal 220c increases, as shown in FIG. 16, before the gimbal 220c comes into contact with one of electrodes 340a to 340d, one projection 223 comes into contact with a base 310 of an electrode substrate 300 to stop movement of the gimbal 220c. Thus, the gimbal 220c does not come into contact with any one of the electrodes 340a to 340d. The projections 223 are molded monolithically with the gimbal 220c, and a ground potential of the same potential as that of the gimbal 220c is applied to the projections 223. Since an insulating layer 311 is formed on the surface of the base 310, even if one projection 223 comes into contact with the base 310, they will not stick to each other.

As described above, according to this embodiment, sticking of the gimbal 220c and one of the electrodes 340a to 340d to each other can be prevented by forming the projections 223 at the edge of the gimbal 220c. In this embodiment, no insulator need be disposed in the space between the gimbal 220c and electrode substrate 300. This can decrease the influence that polarization or electrification of the insulator imposes on the force that drives a mirror 230b, and can accordingly suppress drift.

When the size of the gimbal 220c is increased, the mass of the gimbal 220c increases, and accordingly the operation speed of the gimbal 220c decreases. In contrast to this, according to this embodiment, an increase in mass of the gimbal 220c can be suppressed to a necessary minimum level by optimizing the sizes, positions, distal end shapes, and the like of the projections 223. This can suppress a decrease in operation speed of the gimbal 220c.

As the gimbal 220c rotates about the gimbal rotation axis x, the rotating direction of the gimbal 220c intersects the gimbal rotation axis x. Hence, in FIGS. 14 and 15, the projections 223 are provided at a total of six locations at the edge of the gimbal 220c, i.e., two locations in a direction (the direction of the mirror rotation axis y) perpendicular to the gimbal rotation axis x and four locations in directions each at 45° with respect to the gimbal rotation axis x. Note that the shapes and positions of the projections 223 are not limited to this. More specifically, the number of projections 223 may be increased in the same manner as in FIG. 10, the distal ends of the projections 223 may be rounded in the same manner as in FIG. 10, the distal ends of the projections 231 may be sharpened in the same manner as in FIGS. 11 and 12, or T-shaped projections 223 may be provided in the same manner as in FIG. 13.

Figure 17:
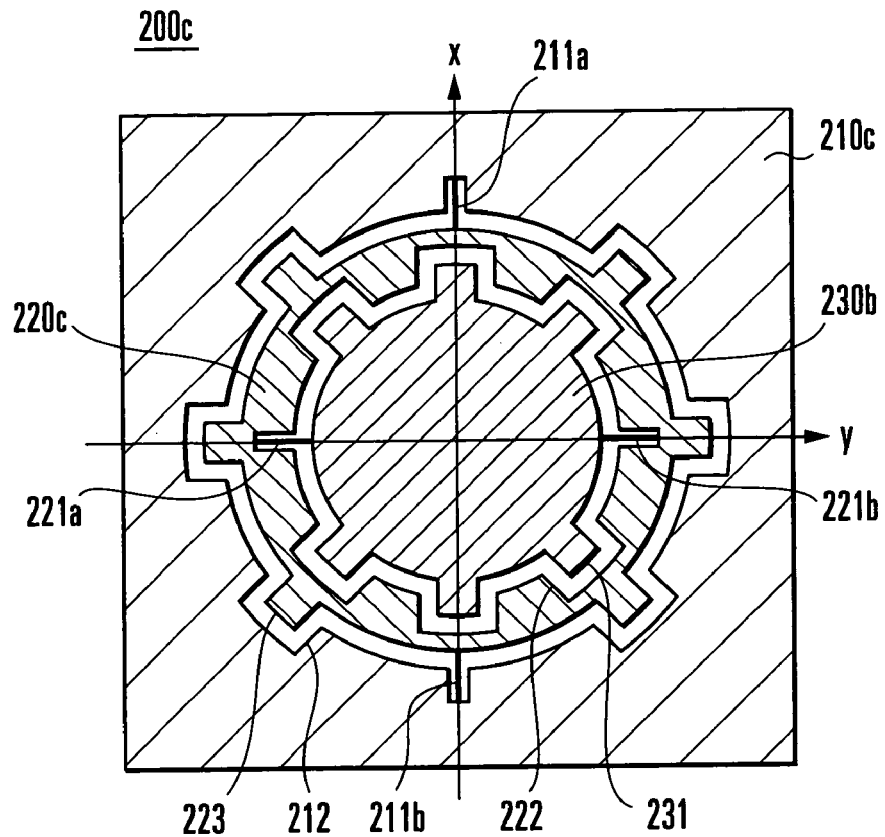
FIG. 17 is a plan view sowing another example of the mirror substrate of the mirror device in FIG. 14.

In this embodiment, as shown in FIG. 17, the gaps between the frame portion 210c and gimbal 220c, between the projections 223 provided to the mirror 230b and notches 212, and between the projections 231 and notches 222 may be increased. This can prevent an increase in moment of inertia of the movable portions, i.e., the gimbal 220c and mirror 230b, thus decreasing the resonance frequency. This signifies prevention of a decrease in switching speed. Also, the rotating characteristics of the gimbal rotation axis x and those of the mirror rotation axis y can be approximated to each other. More specifically, the resonance frequencies about two rotation axes can be approximated to each other, and accordingly the direction dependency of the mirror 230b can be decreased.

Fifth Embodiment

Figure 18:
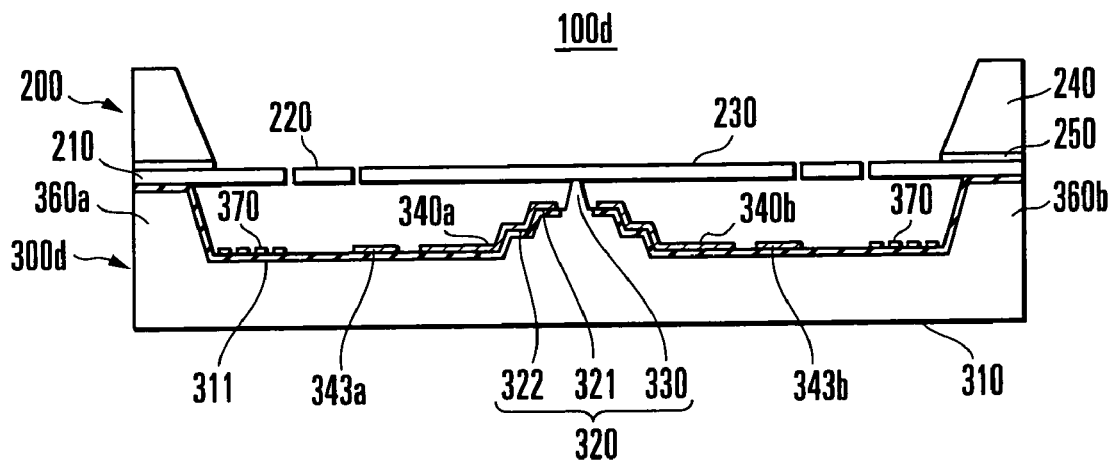
FIG. 18 is a sectional view showing the arrangement of a mirror device according to the fifth embodiment of the present invention.
Figure 19:
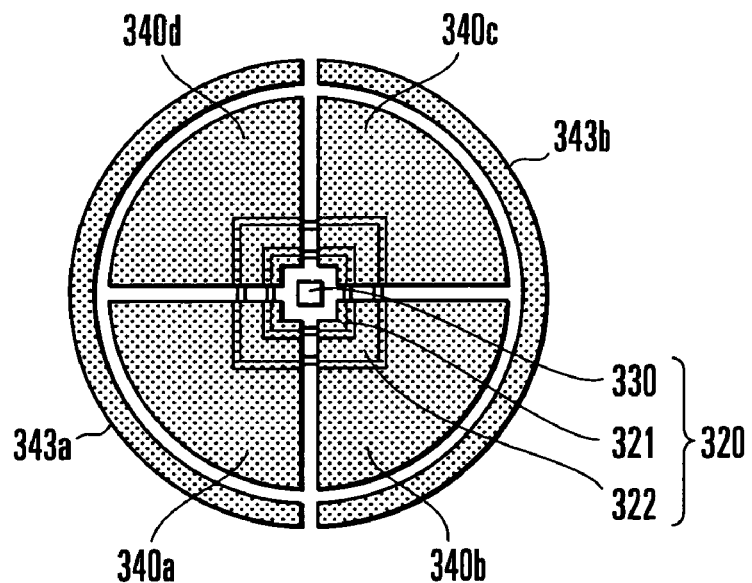
FIG. 19 is a plan view showing the arrangement of the electrode substrate of the mirror device in FIG. 18.
Figure 20:
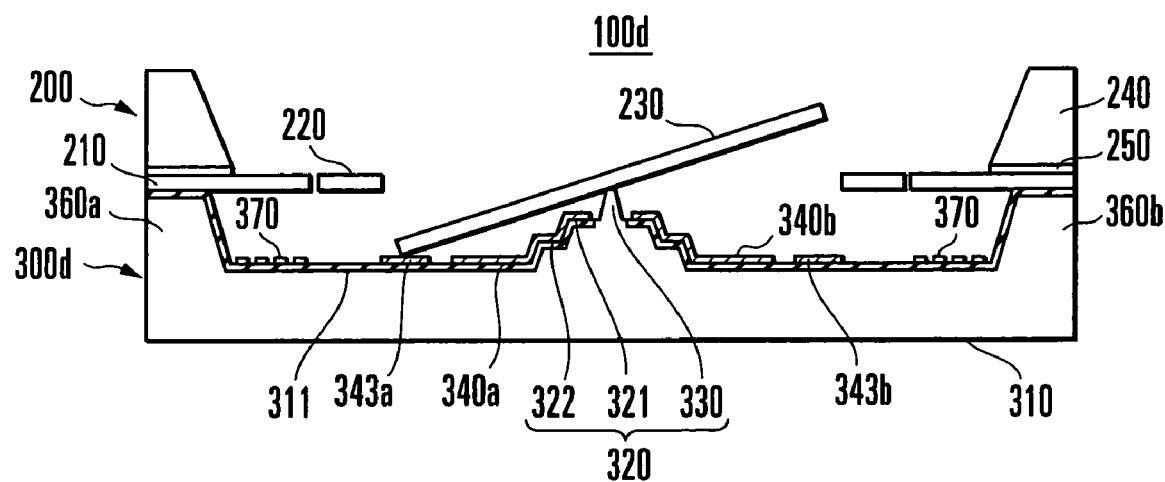
FIG. 20 is a plan view to explain the effect of the fifth embodiment of the present invention.

A mirror device according to the fifth embodiment of the present invention will be described with reference to FIGS. 18 to 20. In FIGS. 18 to 20, the same arrangements as those in FIGS. 1 and 2 are denoted by the same reference numerals. FIG. 18 is a sectional view of the mirror device taken along a plane parallel to the gimbal rotation axis x in FIG. 1. FIG. 19 shows only electrodes 340a to 340d and their peripheries.

A mirror device 100d of this embodiment is obtained by disposing conductive members 343a and 343b made of a metal or the like at such positions on an electrode substrate 300d that a mirror 230 comes into contact with the conductive members 343a and 343b when rotating. The same potential (ground potential) as that for the mirror 230 is applied to the conductive members 343a and 343b. Regarding the relationship between the mirror 230 and the electrodes 340a to 340d, the electrodes 340a to 340d may be downsized with reference to the size of the mirror 230, as described in the first embodiment, or the size of the mirror 230 may be increased with reference to the sizes of the electrodes 340a to 340d.

In this embodiment, even when the tilt angle of the gimbal 230 increases, as shown in FIG. 20, before the mirror 230 comes into contact with one of electrodes 340a to 340d, the mirror 230 comes into contact with one of the conductive members 343a and 343b to stop movement of the mirror 230. Thus, the mirror 230 does not come into contact with any one of the electrodes 340a to 340d. As the conductive members 343a and 343b have the same potential as that of the mirror 230, even if the mirror 230 comes into contact with one of the conductive members 343a and 343b, they will not stick to each other.

As described above, according to this embodiment, sticking of the mirror 230 and one of the electrodes 340a to 340d to each other can be prevented by disposing the conductive members 343a and 343b on the electrode substrate 300d. Also, in this embodiment, as the conductive members 343a and 343b cover an insulating layer 311 formed on the surface of a base 310, the insulator existing in the space between the mirror 230 and electrode substrate 300d can be reduced. This can further suppress drift more than in the first to fourth embodiments.

Although this embodiment is described as a combination with the first embodiment, it can naturally be combined with any one of the second to fourth embodiments. When combining this embodiment with the second embodiment, the conductive members 343a and 343b are disposed in the region surrounded by the broken lines in FIG. 5. When combining this embodiment with the third embodiment, the conductive members 343a and 343b are disposed at such positions on the electrode substrate 300d that one projection 231 of the mirror 230b comes into contact with the conductive members 343a and 343b when rotating. When combining this embodiment with the fourth embodiment, the conductive members 343a and 343b are disposed at such positions on the electrode substrate 300d that one projection 223 of the gimbal 220c comes into contact with the conductive members 343a and 343b when rotating.

Sixth Embodiment

Figure 21:
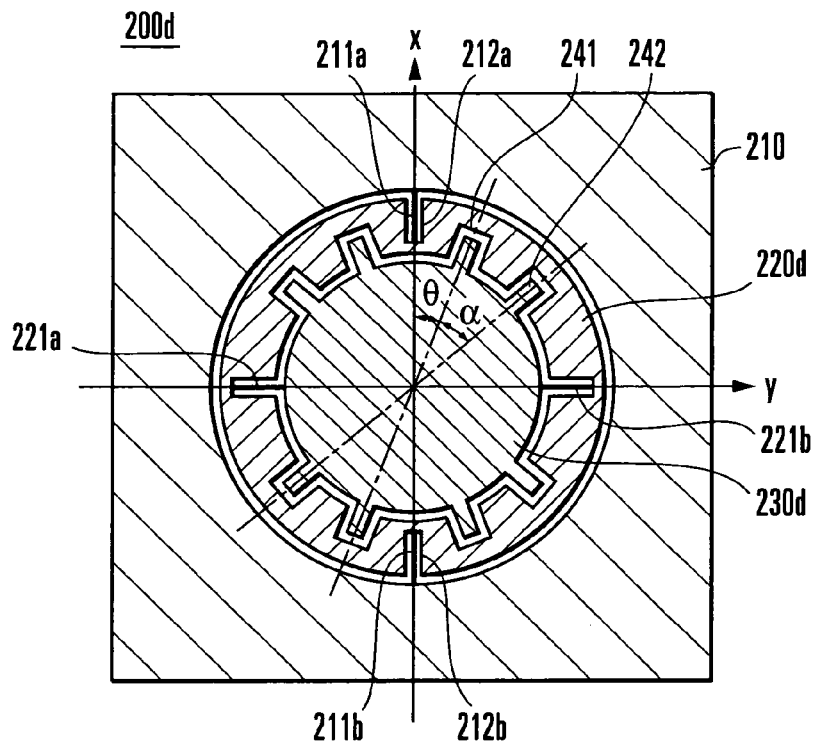
FIG. 21 is a plan view showing the arrangement of the mirror substrate of a mirror device according to the sixth embodiment of the present invention.

In the first to fifth embodiments, the pair of gimbal connectors 211a and 211b are disposed in the notches formed in the frame portion 210 such that they bite into the frame portion 210. Alternatively, the gimbal connectors 211a and 211b may be disposed to bite into the gimbal 220. Hence, in the sixth embodiment, a case in which gimbal connectors are disposed to bite into a gimbal will be described with reference to FIG. 21. In FIG. 21, the same arrangements as in FIGS. 1 and 2 are denoted by the same reference numerals.

A gimbal 220d of a mirror substrate 200d of this embodiment has a pair of notches 212a and 212b formed to bite into the gimbal 220d from its edge along a gimbal rotation axis x. A frame portion 210d has no notches where gimbal connectors 211a and 211b are to be disposed to bite into as in the first to fifth embodiments. One end of each of the pair of gimbal connectors 211a and 211b is connected to the frame portion 210d, and its other end is connected to that end of the corresponding one of the notches 212a and 212b which is close to a mirror 230d side. Hence, the pair of gimbal connectors 211a and 211b are accommodated in the notches 212a and 212b formed to bite into the gimbal 220d.

In this embodiment, since the gimbal connectors 211a and 211b are disposed to bite into the gimbal 220d, no projections 231 can be formed on the gimbal rotation axis x where the distance between the mirror 230b and any one of the electrodes 340a to 340d becomes the smallest, as shown in FIGS. 7, 9, 10, 11, 12, 13, and 15. For example, in the case of FIG. 9, projections are arranged at portions 0° (first projection), 300 (second projection), and 60° (third projection) with respect to the gimbal rotation axis x at an angular interval of 30°. In the sixth embodiment, if projections are to be arranged as in FIG. 9, as the gimbal connectors 211a and 211b are formed on the gimbal 220d along the gimbal rotation axis x, the first projection cannot be formed at the 0° position described above. If only the second and third projections are provided, as the gap between the adjacent second projections is excessively large, depending on the lengths of the second projections, a mirror 230b may collide against one of electrodes 340a to 340d. In this case, although collision can be prevented by increasing the lengths of the projections, depending on the design conditions of the mirror 230b and gimbal 220d, the lengths of the projections may be restricted.

In view of this, according to this embodiment, the projections are arranged around the gimbal connectors 211a and 211b. More specifically, as shown in FIG. 21, each second projection 241 forms an angle θ of 20° and not 30°, unlike in FIG. 9, with respect to the gimbal rotation axis x, so that each second projection 241 is arranged at a position closer to the gimbal rotation axis x. In this case, the gap between the adjacent second projections 241 is 40°, which is smaller than 60° of the case in FIG. 9. Hence, before a point A or A' of the mirror 230d along the gimbal rotation axis x collides against one of the electrodes 340a to 340d, one second projection 241 comes into contact with a base 310 of an electrode substrate 300 to stop movement of the mirror 230d. This can prevent the mirror 230d from coming into contact with one of the electrodes 340a to 340d. Consequently, this can prevent the mirror 230d from coming into contact with one of the electrodes 340a to 340d.

To prevent collision of the mirror 230d with one of the electrodes 340a to 340d, if the thicknesses of the electrodes 340a to 340d and the widths of the second projections 241 are neglected and the geometric structure is considered to focus on the center of the second projections 241, the following equation (3) must be established:

$$(Re+L) \times \cos\theta > Re \quad (3)$$

where L is the lengths of the second projections 241, and θ is the angle at which the second projections 241 are arranged with respect to the gimbal rotation axis x, as described above.

If the second projections 241 are provided to satisfy the condition of equation (3), before the point A or A' of the mirror 230d along the gimbal rotation axis x collides against one of the electrodes 340a to 340d, the two second projections 241 come into contact with those portions of the electrode substrate 300 which are other than the electrodes 340a to 340d. Even if the bonding accuracy of the mirror substrate 200d and electrode substrate 300 and the height of a projection 320 where the electrodes 340a to 340d are formed are considered, the collision of the mirror 230d with one of the electrodes 340a to 340d can be prevented by setting the positions, lengths, and widths of the second projections 241 and third projections 242 appropriately.

In this embodiment, since an angle α that each third projection 242 forms with the corresponding second projection 241 is 30°, which is the same as in the conventional case, the angle that each third projection 242 forms with the x-axis is not 60° but 50°. Thus, the third projections 242 are arranged at such positions that they readily collide against the electrodes 340a to 340d. In this manner, the shapes of the mirror 230d, the gimbal 210d, gimbal connectors 211a and 211b, and mirror connectors 221a and 221b restrict the positions of the projections. If, however, the lengths, widths, positions, and the like of the projections are selected appropriately, fixing of the mirror 230b with the electrodes 340a to 340d can be prevented.

Figure 22:
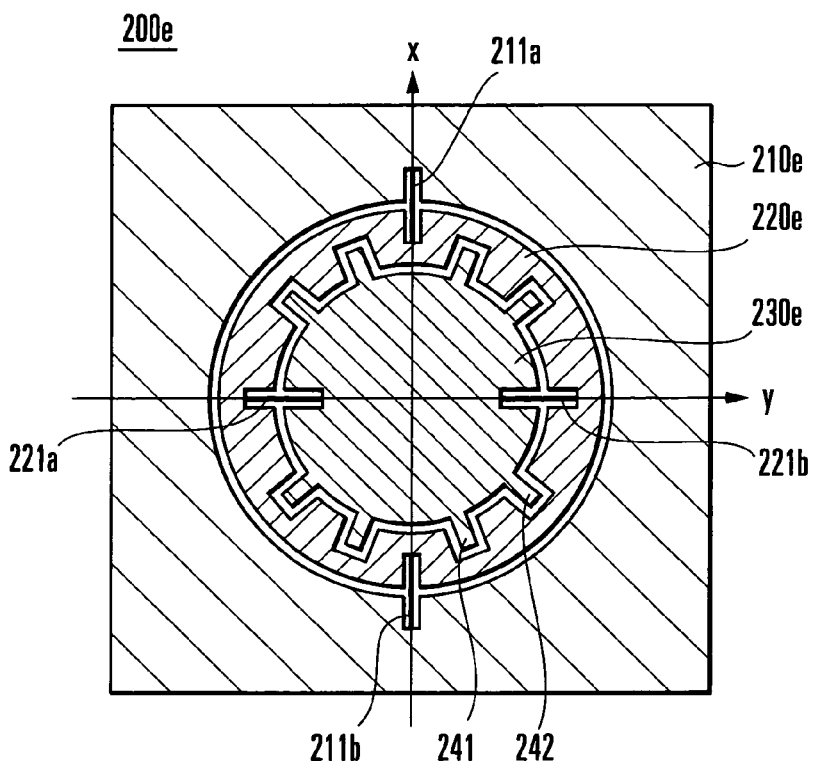
FIG. 22 is a plan view showing another example of the mirror substrate of each of the first to sixth embodiments of the present invention.

This embodiment can naturally be combined with the fifth embodiment. In the first to sixth embodiments, as in a mirror substrate 200e shown in FIG. 22, the gimbal connectors 211a and 211b may be formed to bite into both a frame portion 210e and gimbal 220e, and the mirror connectors 221a and 221b may be formed to bite into both the gimbal 220e and mirror 230e. At this time, the second projections 241 and third projections 242 may be formed close to the gimbal rotation axis x, in the same manner as in the sixth embodiment, or furthermore the gimbal 230e may be provided with projections, in the same manner as in the fifth embodiment. The projections to be provided to the gimbal 230e may be close to the mirror rotation axis y, in the same manner as in the sixth embodiment.

Seventh Embodiment

The seventh embodiment of the present invention will be described.

Figure 28:
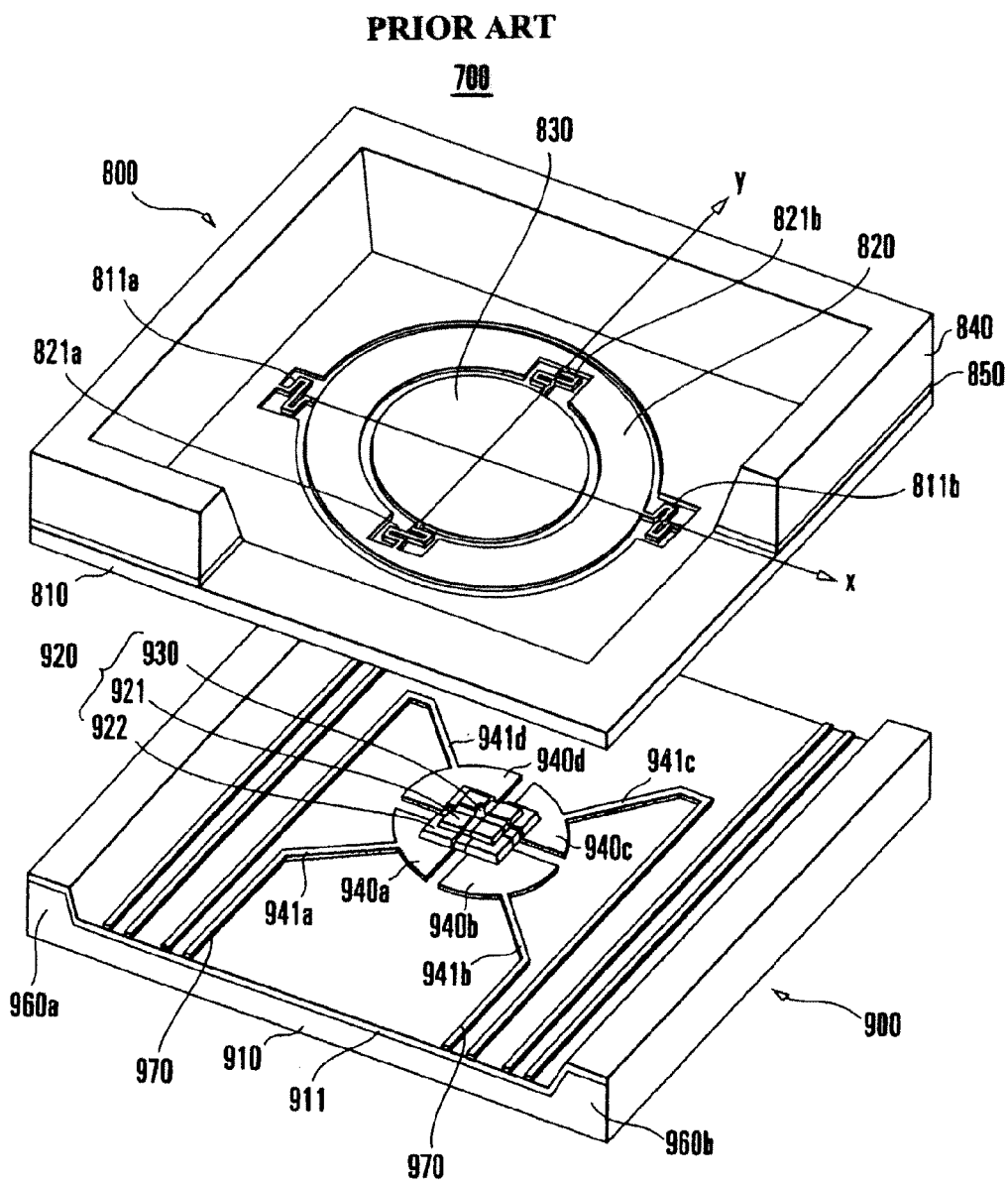
FIG. 28 is an exploded perspective view showing the arrangement of a conventional mirror device.

A method of manufacturing the conventional mirror device 700 described above will be briefly explained. The mirror substrate 800 can be formed of an SOI (Silicon On Insulator) substrate. The SOI substrate comprises a thin silicon layer (SOI layer) on a thick silicon base portion through a buried insulating layer. Plate-like structures such as the frame portion 810, gimbal 820, mirror 830, and the like can be formed by processing the SOI layer. The frame portion 840 can be formed by removing portions of the SOI substrate to leave the thick base portions in the form of a frame. The insulating layer 850 shown in FIGS. 28 and 29 corresponds to the buried insulating layer of the SOI substrate.

The electrode substrate 900 can be formed by etching a single-crystal silicon substrate, including a major surface with a crystal orientation in the (100) plane, with an alkali solution of potassium hydroxide or the like. As is well known, in single-crystal silicon, the alkali etching rate of the (111) plane is considerably lower than that of the (100) plane or the (110) plane. By utilizing this phenomenon, the prismoidal projection 920 and protrusions 960a and 960b can be formed.

Figure 29:
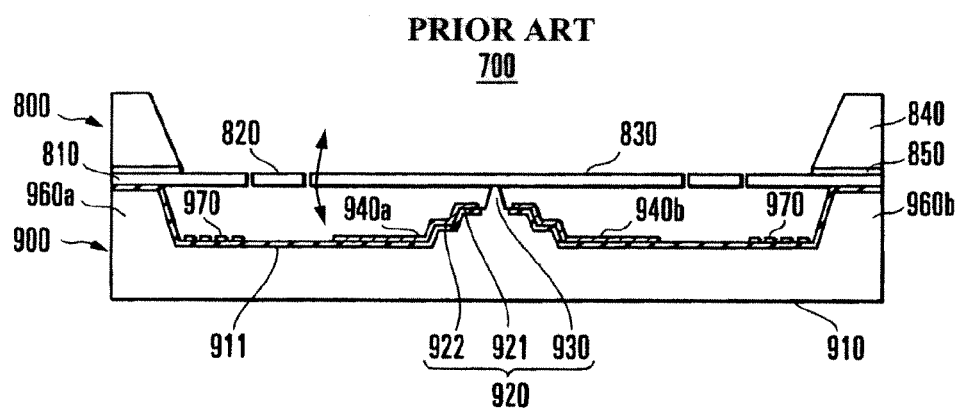
FIG. 29 is a sectional view of the mirror device in FIG. 28.

After the mirror substrate 800 and electrode substrate 900 are formed in the above manner, they are bonded together to form a mirror device as shown in FIG. 29, in which the mirror 830 moves (rotates) upon application of electric fields on the electrodes 940a to 940d. Also, a metal film of gold or the like is formed on the surface (the surface shown in FIG. 28) of the mirror 830 to improve the light reflectance of the mirror 830.

Figure 30:
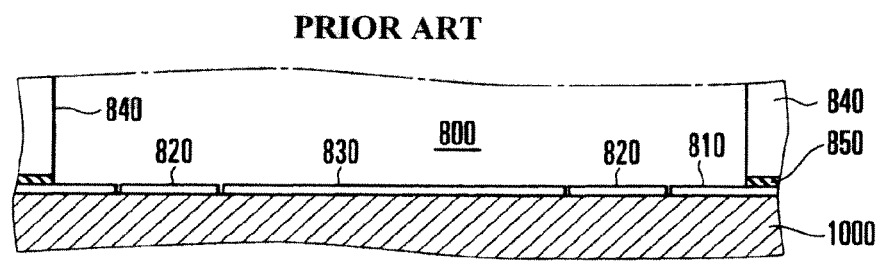
FIG. 30 is a schematic sectional view to explain an example of a conventional mirror substrate manufacturing method.

The metal film described above is formed by, e.g., vacuum deposition or sputtering. When forming the metal film in this manner, for example, as shown by the sectional view in FIG. 30, the mirror substrate 800 is placed on a substrate table 1000 of an apparatus that forms a metal film, and a metal film is formed on the metal film formation surface. At this time, as the surface of the that layer of the mirror substrate 800 where the mirror 830 is formed has very high flatness, the surface on the opposite side of the metal film formation surface is in tight contact with the surface of the substrate table 1000. In this state, if the mirror substrate 800 is to be separated from the substrate table 1000, for example, the mirror 830 does not separate from the substrate table 1000 with which it is in tight contact, and may be sheared at the connecting portion and fractured. In this manner, conventionally, a very small movable portion such as the mirror may be fractured easily during the manufacture.

This embodiment is made to solve even the above problem as well, and has as its object to enable the manufacture of a mirror device including a mirror substrate in a state where damages such as a fracture do not occur easily.

This embodiment will now be described with reference to FIGS. 23A to 25. In FIGS. 23A to 25, the same arrangements as in FIGS. 1 and 2 are denoted by the same reference numerals.

Figure 23A:
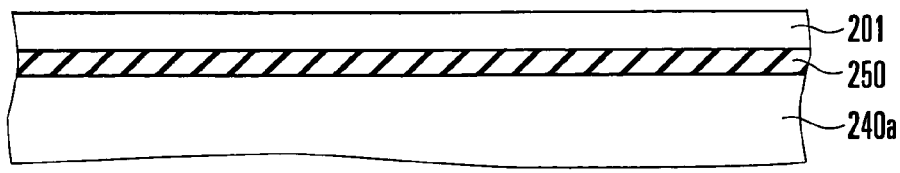
FIGS. 23A to 23F are views for explaining exemplary steps in a mirror device manufacturing method according to the seventh embodiment of the present invention.
Figure 23B:
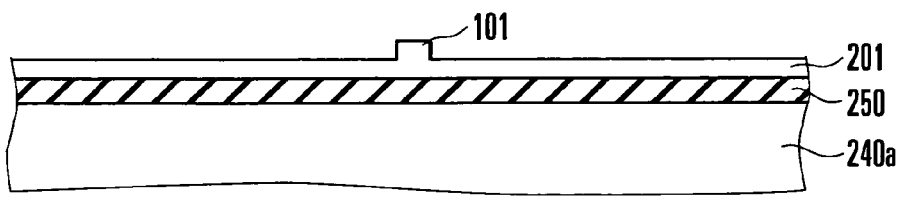

First, according to a mirror device manufacturing method of this embodiment, as shown in FIG. 23A, an SOI substrate is prepared in which, for example, a 1-μm thick insulating layer 250 made of silicon oxide and a 20-μm thick single-crystal silicon layer (SOI layer) 201 are formed on a silicon base 240a having a surface orientation (100). The insulating layer 250 is a buried insulating layer. Subsequently, the SOI layer 201 is processed by the known photolithography technique and etching technique to form a projecting structure 101 having a height of about 10 μm on the SOI layer 201, as shown in FIG. 23B. The projecting structure 101 suffices as far as it is arranged at the center of one prospective mirror device region. The projecting structure 101 can be formed to have a height of, e.g., about 15 μm. In this case, an SOI substrate having an SOI layer 201 with a thickness of about 25 μm can be employed.

Figure 23C:
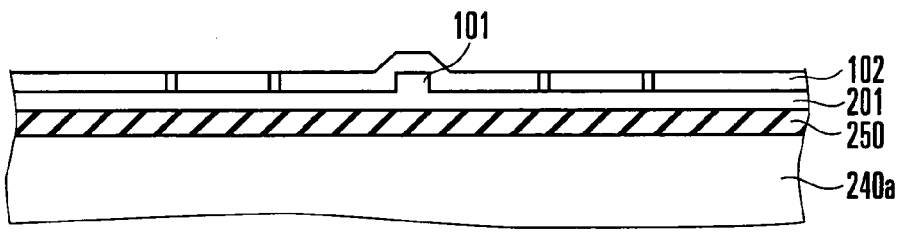
Figure 23D:
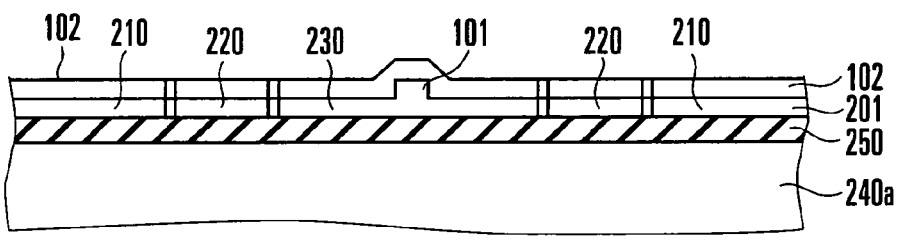

As shown in FIG. 23C, a mask pattern (movable portion formation mask pattern) 102 is formed on the SOI layer 201. Then, using the mask pattern 102 as a mask, the SOI layer 201 is etched. This etching is performed by directional etching such as reactive ion etching to expose the surface of the insulating layer 250 at the etching portion. This etching forms a frame portion 210, a gimbal 220, a mirror (mirror structure) 230, and connectors and mirror connectors (not shown), as shown in FIG. 23D, so that the basic arrangement of the mirror substrate is formed. Also, the projecting structure 101 is formed at the center of each mirror 230.

The mask pattern 102 is removed, and a mask pattern (not shown) is formed on the lower surface of the silicon base 240a. The mask pattern is a pattern (frame formation mask pattern) corresponding to one mirror portion that constitutes a mirror array. This pattern has square regions open for the corresponding mirrors. After this, using the mask pattern as a mask, the silicon base 240a is etched by dry etching using, e.g., a CF-based gas, until the insulating layer 250 is exposed. This etching may employ wet etching instead.

Figure 23E:
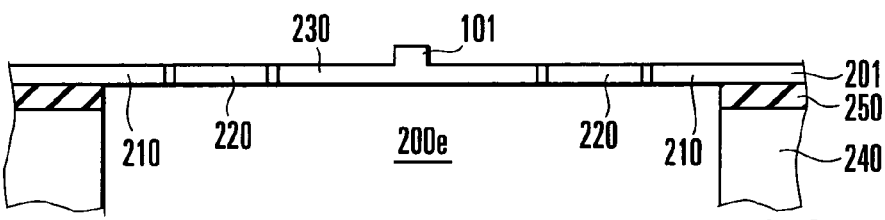

After this, the mask pattern is removed. The mask pattern may be removed by ashing or appropriate etching. Then, that portion of the insulating layer 250 which is exposed to the interior of the formed open region is removed to form a frame portion 240, as shown in FIG. 23E. Hence, a mirror substrate 200e including a plurality of mirror devices each comprising the frame portion 210, the gimbal 220, and a mirror 230e is formed in the SOI layer 201 which is supported on the frame portion 240 through the insulating layer 250.

In the respective steps such as dry etching and removal of mask pattern of the formation of the frame portion 240 described above, the mirror substrate 200e is placed on the substrate base (substrate support surface) of each processing apparatus such that that surface of the mirror substrate 200e where the projecting structure 101 is formed opposes the substrate base. Due to the presence of the projecting structure 101, for example, the mirror 230e does not come into contact with the surface of the substrate base. Therefore, after the mirror 230e and the like are formed, when separating the mirror substrate 200e from the substrate base, the movable portions including the mirror 230e also separate from the substrate base easily. As a result, according to this manufacturing method which forms the projecting structure 101, any damage to a fine movable portion such as the mirror 230e can be prevented in the above manufacturing process.

Figure 23F:
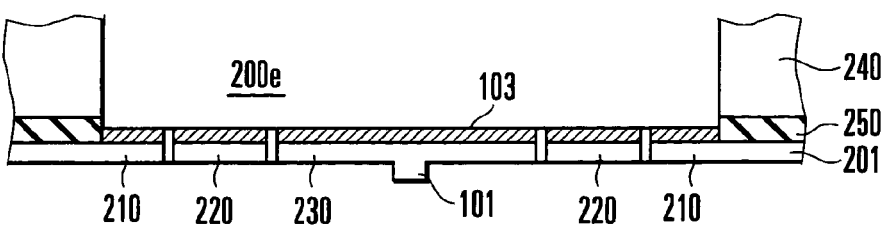

Subsequently, as shown in FIG. 23F, a reflecting film 103 comprising a metal thin film of gold or the like is formed on that reflecting surface of each mirror device which is exposed to the interior of the frame portion 240. The reflecting film 103 can be formed by depositing, e.g., a metal by sputtering to form a thin film. At this time, the mirror substrate 200e is placed on the substrate base (substrate support surface) of the thin-film sputtering formation apparatus such that that surface of the mirror substrate 200e where the projecting structure 101 is formed opposes the substrate base. In this case as well, due to the presence of the projecting structure 101, for example, the mirror 230e does not come into tight contact with the surface of the substrate base. Hence, after the reflecting film 103 is formed, when separating the mirror substrate 200e from the substrate base, the movable portions including the mirror 230e also separate from the substrate base easily. As a result, according to this manufacturing method which forms the projecting structure 101, any damage to a fine movable portion such as the mirror 230e can be prevented in the above manufacturing process.

Figure 24:
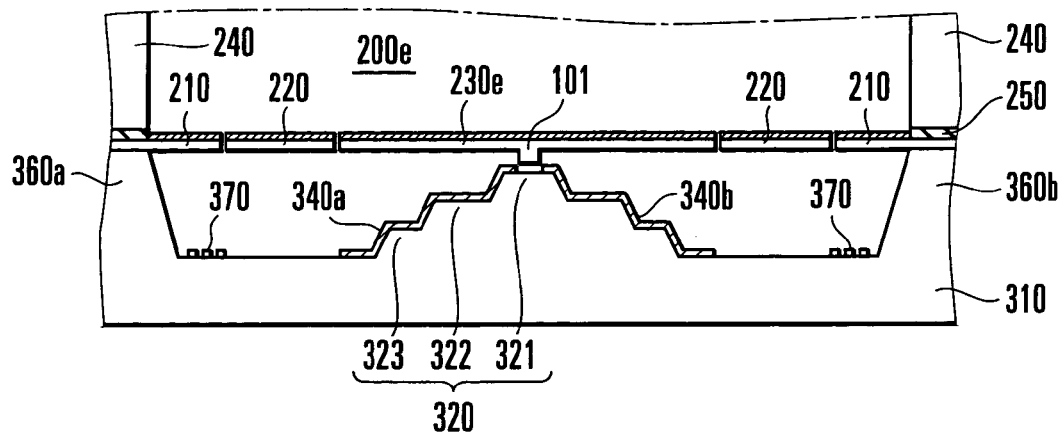
FIG. 24 is a sectional view schematically showing an arrangement of the mirror device according to the seventh embodiment of the present invention.

After the reflecting film 103 is formed on the reflecting surface of the mirror substrate 200e in the above manner, the lower surface of the frame portion 210 is bonded to the upper surfaces of protrusions 360a and 360b while each mirror 230e opposes corresponding electrodes 340a to 340d, as shown in FIG. 24. Hence, the mirror device comprising the mirror substrate 200e and an electrode substrate 300 is obtained.

Figure 25:
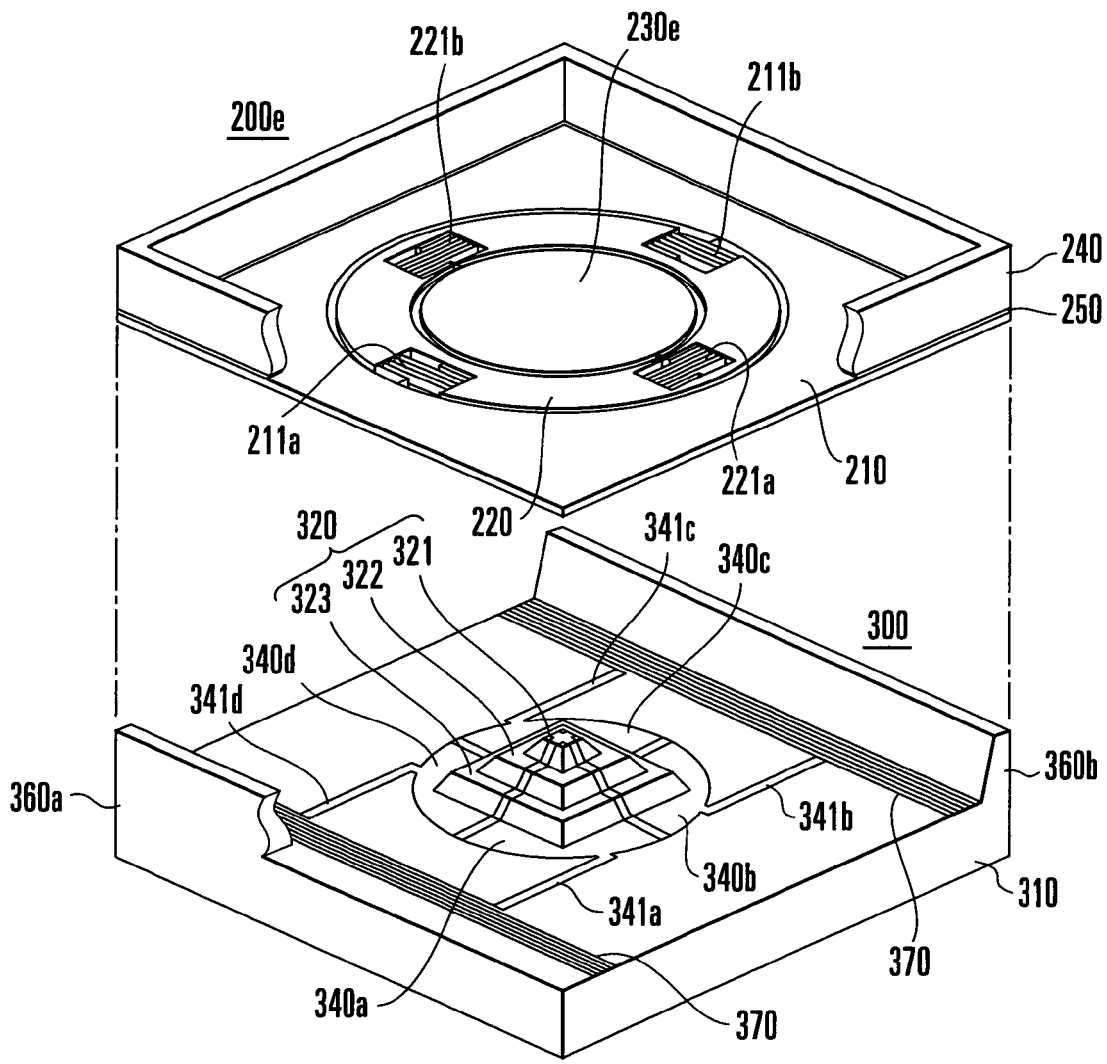
FIG. 25 is a perspective view showing an arrangement of the mirror device according to the seventh embodiment of the present invention.

The mirror device described above will be described in more detail with reference to FIG. 25. FIG. 25 mainly shows part of a mirror device as one constituent unit of a mirror array. Note that FIG. 25 does not show a projecting structure for the illustrative convenience. In the mirror array, for example, mirror devices each shown in FIG. 25 are arranged two-dimensionally to form a square. The mirror array comprises the mirror substrate 200e having a plurality of mirrors, and the electrode substrate 300 having a plurality of electrode portions. The mirror substrate 200e and electrode substrate 300 are disposed parallel to each other.

The mirror substrate 200e comprises the plate-like frame portion 210, ring-like gimbal 220, and disc-like mirror 230e. The frame portion 210 comprises an opening which is almost circular when seen from the top. The gimbal 220 is arranged in the opening of the frame portion 210 and connected to the frame portion 210 by a pair of connectors 211a and 211b. The gimbal 220 also has an opening which is almost circular when seen from the top. The mirror 230e is arranged in the opening of the gimbal 220 and connected to the gimbal 220 by a pair of mirror connectors 221a and 221b. The frame portion 240 which surrounds the gimbal 220 and mirror 230e is formed around the frame portion 210. The frame portion 240 is fixed to the frame portion 210 through the insulating layer 250.

The connectors 211a and 211b respectively are formed in the notches of the gimbal 220 and comprise serpentine-shaped torsion springs to connect the frame portion 210 to the gimbal 220. The gimbal 220 connected to the frame portion 210 in this manner is rotatable about a gimbal rotation axis extending through the connectors 211a and 211b. The mirror connectors 221a and 221b respectively are formed in the notches of the gimbal 220 and comprise serpentine-shaped torsion coils to connect the gimbal 220 to the mirror 230e. The mirror 230e connected to the gimbal 220 in this manner is rotatable about a mirror rotation axis extending through the mirror connectors 221a and 221b. The gimbal rotation axis and mirror rotation axis are orthogonal.

The electrode substrate 300 has a plate-like base 310, a projection 320 formed on the base 310, and the protrusions 360a and 360b formed on the periphery of the projection 320. The projection 320 comprises a prismoidal third terrace 323, a prismoidal second terrace 322 formed on the upper surface of the third terrace 323, and a prismoidal first terrace 321 formed on the upper surface of the second terrace 322. Fan-shaped electrodes 340a, 340b, 340c, and 340d are formed on the upper surface of the electrode substrate 300 including the outer surface of the projection 320 to fall within a circle concentric with the mirror 230e of the opposing mirror substrate 200e.

Furthermore, interconnections 370 are formed on the periphery of the projection 320 of the electrode substrate 300, and are connected to the electrodes 340a to 340d via lines 341a to 341d. The respective electrodes may be disposed without providing the projection 320. The interconnections need not be formed on the surface of the electrode surface where the respective electrodes are formed, but can be disposed in the electrode substrate via through-interconnections.

The mirror device having the above arrangement serves to apply an attracting force to the mirror 230e with an electric field generated when individual voltages are applied to the respective electrodes 340a to 340d through the interconnections 370, thus tilting the mirror 230e at an angle of several degrees. If no voltages are applied to the electrodes 340a to 340d, the mirror 230e is almost parallel (initial position) to the electrode substrate 300 (frame portion 210). In this state, the tilt of the mirror 230e can be controlled by applying individual voltages to the electrodes 340a to 340d.

In this mirror device, as the mirror 230e is provided with the projecting structure 101, as shown in FIG. 24, the mirror 230e can be suppressed from being pulled in to cause sticking. Pull-in refers to a phenomenon in which the electrostatic attracting force of the electrodes 340a to 340d excels the restoration force of the gimbal connectors 211a and 211b or mirror connectors 221a and 221b to disable control of the posture of the mirror 230e. Due to such pull-in, for example, if the mirror 230e does not stop rotating and collides against the projection 320, depending on the case, short-circuiting occurs between the mirror 230e and the respective electrodes, thus causing fracture or sticking of the mirror 230e and the respective electrodes. With this mirror device, however, even if voltages (bias voltages) are applied to the electrodes 340a to 340d and the mirror 230e moves toward the electrode substrate 300, the projecting structure 101 comes into contact with the upper surface of the first terrace 321. Hence, even if pull-in occurs, the mirror 230e and projection 320 can be suppressed from coming into contact with each other.

In the above description, the projecting structure 101 is arranged at almost the center of the mirror 230e. However, the present invention is not limited to this. For example, the projecting structure 101 can be arranged at a position shifted from the center of the mirror 230e. In this manner, if the projecting structure 101 is arranged to be shifted from the center of the mirror 230e, when the projecting structure 101 abuts against the first terrace 321 upon application of the bias voltages descried above, the mirror 230e tilts with respect to the plane of the frame portion 210 by a predetermined angle. Therefore, if the projecting structure 101 is arranged at a position shifted from the mirror center in this manner, the mirror 230e can be rotated (tilted) by only applying a uniform bias voltage to the electrodes 340a to 340d.

The projecting structure 101 may be arranged such that, when the mirror substrate 200e is bonded to the electrode substrate 300, the projecting structure 101 is aligned with the position of the vertex (first terrace 321) of the projection 320. For example, assume that the center position of the mirror 230e is misaligned from the center position of the projection 320. In this case, the projecting structure 101 may be formed to be located at the vertex position of the projection 320 which is misaligned. With this arrangement, the mirror 230e can be rotated (tilted) by only applying a uniform bias voltage to the electrodes 340a to 340d, in the same manner as described above.

Figure 26A:
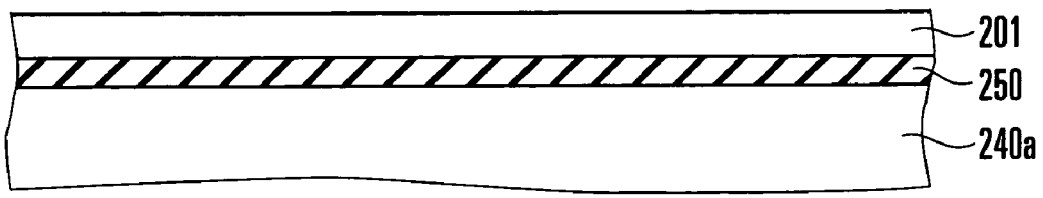
FIGS. 26A to 26G are views for explaining other exemplary steps in the mirror device manufacturing method according to the seventh embodiment of the present invention.
Figure 26B:
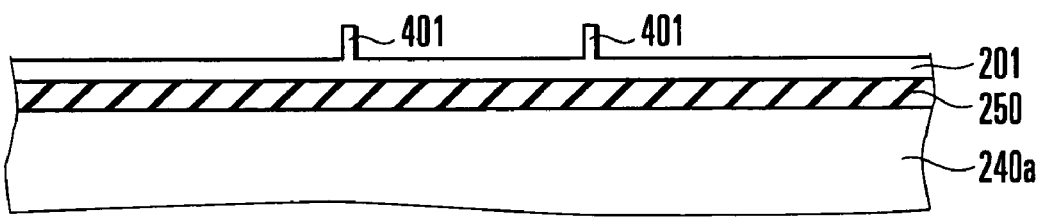

Another example of the mirror device manufacturing method according to this embodiment will be described. First, as shown in FIG. 26A, an SOI substrate is prepared in which, for example, the 1-μm thick insulating layer 250 made of silicon oxide and the 20-μm thick SOI layer 201 are formed on the silicon base 240a having a surface orientation (100). This is the same as in the method shown in FIG. 23. Subsequently, the SOI layer 201 is processed by the known photolithography technique and etching technique to form a plurality of projecting structures 401 each having a height of about 10 μm on the SOI layer 201, as shown in FIG. 26B. For example, the projecting structures 401 may be arranged evenly around one prospective mirror device region.

Figure 26C:
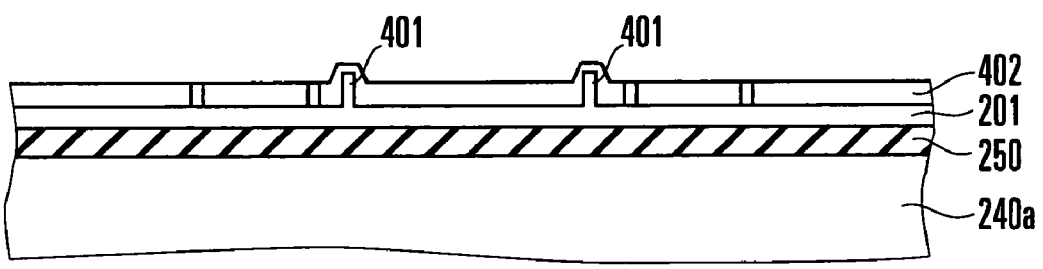
Figure 26D:
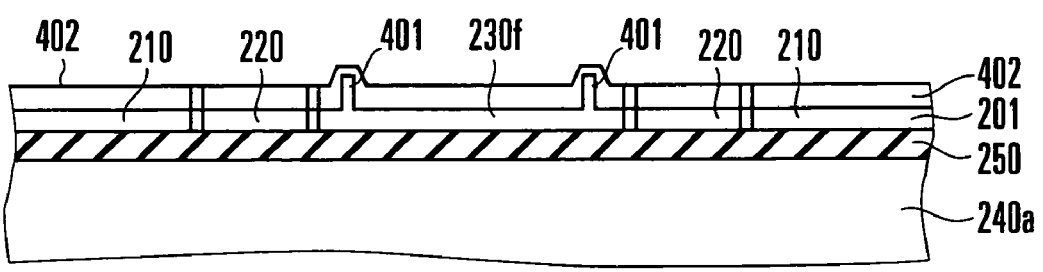

As shown in FIG. 26C, a mask pattern 402 is formed on the SOI layer 201. Then, using the mask pattern 402 as a mask, the SOI layer 201 is etched. This etching is performed by directional etching such as reactive ion etching to expose the surface of the insulating layer 250 at the etching portion. This etching forms the frame portion 210, the gimbal 220, a mirror (mirror structure) 230f, and connectors and mirror connectors (not shown), as shown in FIG. 26D, so that the basic arrangement of the mirror substrate is formed. Also, the plurality of projecting structures 401 are formed around each mirror 230f.

The mask pattern 402 is removed, and a mask pattern (not shown) is formed on the lower surface of the silicon base 240a. The mask pattern is a pattern corresponding to one mirror portion that constitutes a mirror array. This pattern has square regions open for the corresponding mirrors. After this, using the mask pattern as a mask, the silicon base 240a is etched by dry etching using, e.g., a CF-based gas, until the insulating layer 250 is exposed. This etching may employ wet etching instead.

Figure 26E:
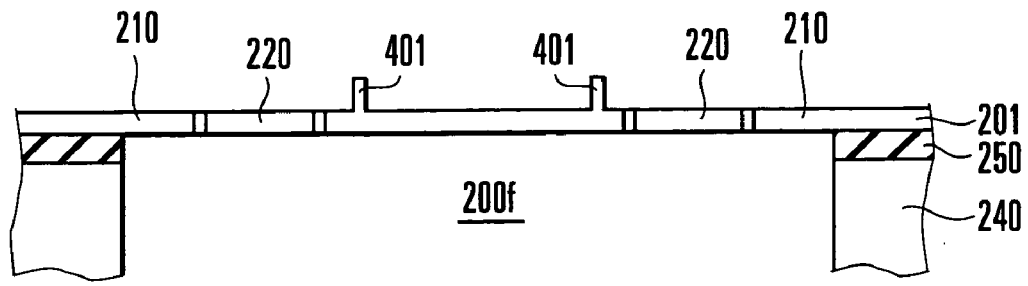

After this, the mask pattern is removed. The mask pattern may be removed by ashing or appropriate etching. Then, that portion of the insulating layer 250 which is exposed to the interior of the formed open region is removed to form the frame portion 240, as shown in FIG. 26E. Hence, a mirror substrate 200f including a plurality of mirror devices each comprising the frame portion 210, gimbal 220, and mirror 230f is formed in the SOI layer 201 which is supported on the frame portion 240 through the insulating layer 250.

In the respective steps such as dry etching and removal of mask pattern of the formation of the frame portion 240 described above, the mirror substrate 200f is placed on the substrate base (substrate support surface) of each processing apparatus such that that surface of the mirror substrate 200f where the projecting structure 401 are formed opposes the substrate base. Due to the presence of the projecting structures 401, for example, the mirror 230f does not come into contact with the surface of the substrate base. Therefore, after the mirror 230f and the like are formed, when separating the mirror substrate 200f from the substrate base, the movable portions including the mirror 230f also separate from the substrate base easily. As a result, according to this manufacturing method which forms the projecting structure 401, any damage to a fine movable portion such as the mirror 230f can be prevented in the above manufacturing process.

Figure 26F:
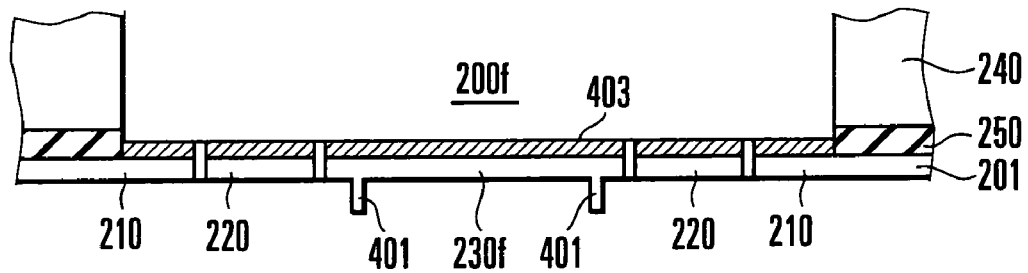

Subsequently, as shown in FIG. 26F, a reflecting film 403 comprising a metal thin film of gold or the like is formed on that reflecting surface of each mirror device which is exposed to the interior of the frame portion 240. The reflecting film 403 can be formed by depositing, e.g., a metal by sputtering to form a thin film. At this time, the mirror substrate 200f is placed on the substrate base (substrate support surface) of the thin-film sputtering formation apparatus such that that surface of the mirror substrate 200f where the projecting structure 401 is formed opposes the substrate base. In this case as well, due to the presence of the projecting structures 401, for example, the mirror 230f does not come into tight contact with the surface of the substrate base. Hence, after the reflecting film 403 is formed, when separating the mirror substrate 200f from the substrate base, the movable portions including the mirror 230f also separate from the substrate base easily. As a result, according to this manufacturing method which forms the projecting structure 401, any damage to a fine movable portion such as the mirror 230f can be prevented in the above manufacturing process.

Figure 26G:
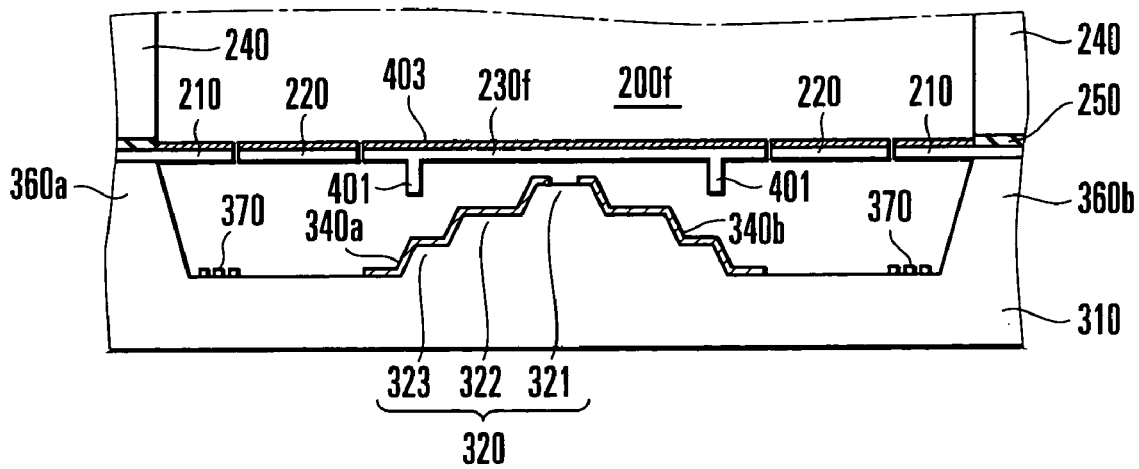

After the reflecting film 403 is formed on the reflecting surface of the mirror substrate 200f in the above manner, the lower surface of the frame portion 210 is bonded to the upper surfaces of protrusions 360a and 360b while each mirror 230f opposes corresponding electrodes 340a to 340d, as shown in FIG. 26G. Hence, the mirror device comprising the mirror substrate 200f and the electrode substrate 300 is obtained.

According to this mirror device, due to the presence of the plurality of projecting structures 401 as shown in FIG. 26G, even if the rotation of the mirror 230f causes pull-in, sticking of the mirror 230f can be prevented. For example, when the mirror 230f is rotated (tilted) by controlling the voltages to be applied to the electrodes 340a, 340b, 340c, and 340d, the distal end of any one projecting structure 401 will come into contact with the projecting structure 401 (electrode) first. As a result, the pull-in or the contact of the mirror 230f with the electrode through a wide area can be suppressed.

In the above description, a case in which the projecting structure is formed at the center of the mirror and a case in which the projecting structures are formed around the mirror have been described. However, the present invention is not limited to these cases. For example, a projecting structure may be formed at the center of the mirror, and simultaneously a plurality of projecting structures may be formed around the mirror. The positions to form the projecting structures are not limited. In the above description, the projecting structure is formed, and after that the mirror structure such as the mirror is formed. However, the present invention is not limited to this. For example, a projecting structure may be formed after a mirror structure is formed, as far as it is before the mirror structure becomes movable, for example, before a frame portion is formed.

In this embodiment, an insulating layer may be formed on the projecting structure 101 or projecting structures 401. This will be exemplified by a case of forming an insulating portion on the projecting structure 101. In the following description, the same constituent elements as those in FIGS. 23A to 23F are referred to by the same names and denoted by the same reference numerals, and a description thereof will be omitted where appropriate.

Figure 27A:
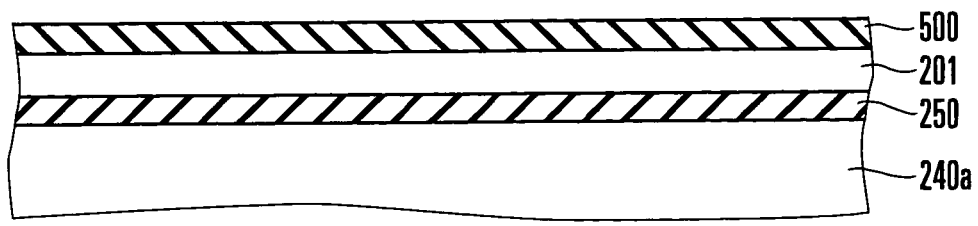
FIGS. 27A to 27E are views for explaining an example of providing a projecting structure with an insulating portion in the mirror device manufacturing method according to the seventh embodiment of the present invention.

First, as shown in FIG. 27A, an insulating layer 500 made of silicon oxide is formed on the SOI layer 201 of the SOI substrate shown in FIG. 23A.

Figure 27B:
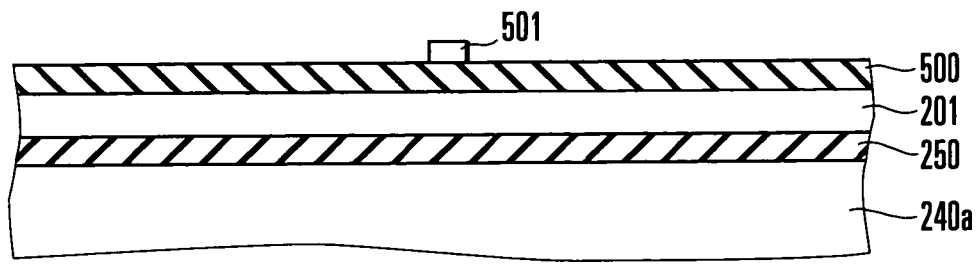
Figure 27C:
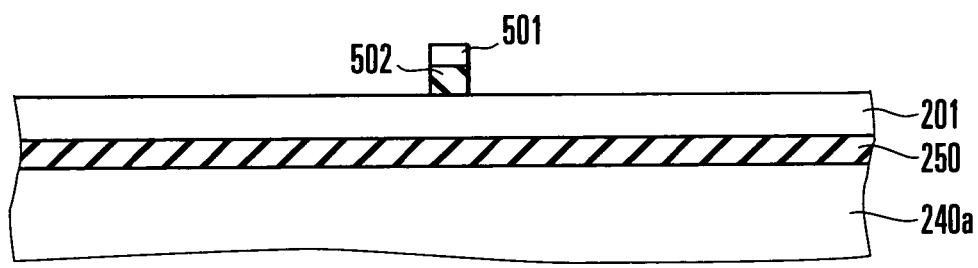

As shown in FIG. 27B, a mask pattern (insulating layer formation mask pattern) 501 is formed on the insulating layer 500. Using the mask pattern 501 as a mask, the insulating layer 500 is processed by the known etching technique to form an insulating portion 502, as shown in FIG. 27C.

Figure 27D:
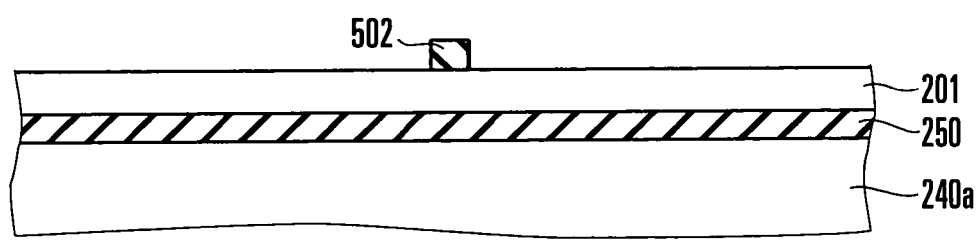

The mask pattern 501 is removed by ashing or appropriate etching. Thus, the insulating portion 502 is exposed as shown in FIG. 27D.

Figure 27E:
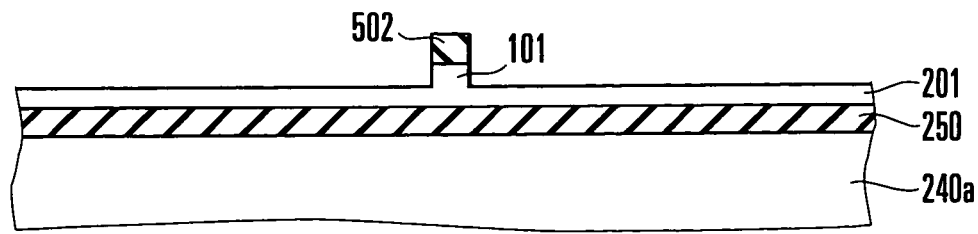

Using the insulating portion 502 as a mask, the SOI layer 201 is etched by the known etching technique so that a projecting structure 101 having a height of about 10 µm is formed on the SOI layer 201 and that the insulating portion 502 is formed on the projecting structure 101, as shown in FIG. 27E. After this, a mirror device in which the insulating portion 502 is formed on the projecting structure 101 can be formed in accordance with the same method as that described with reference to FIGS. 23A to 23F.

As described above, as the insulating portion 502 is formed on the projecting structure 101, even if the projecting structure 101 comes into contact with one of the electrodes 340a to 340d, the insulating portion 502 can prevent the mirror from sticking to the corresponding one of the electrodes 340a to 340d.

In the above description, silicon oxide is used as the insulating portion 502. Alternatively, a nitride film may be used in place of silicon oxide. If silicon oxide is used as the insulating portion 502 described above, when removing the insulating layer 250 made of silicon oxide, the insulating portion 502 made of silicon oxide and formed on the projecting structure 101 is also undesirably etched. Hence, an etching protection film must be formed to protect the insulating portion 502. In contrast to this, if a silicon nitride film is used as the insulating portion 502, when etching the insulating layer 250 made of silicon oxide, the insulating portion 502 will not be etched. Therefore, no etching protection film need be formed unlike in the case using silicon oxide. Therefore, the manufacturing process can be simplified.

In the above description, the insulating layer 500 and SOI layer 201 are etched sequentially. Alternatively, using the mask pattern 501 as a mask, the insulating layer 500 and SOI layer 201 may be etched together at once, and thereafter the insulating portion 502 and projecting structure 101 may be formed.

Also, an insulating portion can naturally be formed on the projecting structures 401 of the mirror device shown in FIGS. 26A to 26G in accordance with the same method as that shown in FIGS. 27A to 27E. In this case, since the mirror may come into contact with one of the electrodes 340a and 340d more likely than in the case using the projecting structure 101, sticking of the mirror and one of the electrodes 340a to 340d to each other can be prevented more effectively.

The invention claimed is:
1. A mirror device characterized by comprising:
a mirror rotatably supported by an upper substrate;
a first electrode which is formed on a lower substrate opposing said upper substrate to be spaced apart therefrom by a predetermined gap, and controls a tilt angle of said mirror;
a collision preventive structure which is provided to said mirror and prevents collision of said mirror with said first electrode when said mirror rotates;
said mirror device further comprises a gimbal, having the same electric potential as that of said mirror, which is supported to be rotatable with respect to said upper substrate and includes an inner opening for rotatably supporting said mirror therein; and
said upper substrate being disposed in parallel with said lower substrate,
wherein a distance from a straight line passing a rotation center of said gimbal and perpendicular to a direction parallel to the lower substrate to an edge of said gimbal at a maximum angle of rotation thereof is larger than a distance from the straight line to a distal end of said first electrode.

2. A mirror device according to claim 1,
wherein a distance from the straight line to an edge of said mirror at a maximum angle of rotation thereof is larger than the distance from the straight line to the distal end of said first electrode.

3. A mirror device according to claim 2,
characterized in that said first electrode is disposed at a position closer to the rotation center of said mirror than a position on said lower substrate with which said mirror comes into contact when rotating.

4. A mirror device according to claim 2,
characterized by further having a second electrode which is disposed at a position farther from the rotation center of said mirror than the position on said lower substrate with which said mirror comes into contact hen rotating, and controls a tilt angle of said mirror together with said first electrode.

5. A mirror device according to claim 2,
characterized in that said mirror has a first projection, projecting along a radial direction of said mirror, at an edge thereof.

6. A mirror device according to claim 5,
characterized in that said first projection has the same electric potential as that of said mirror.

7. A mirror device according to claim 1,
characterized in that said first electrode is disposed at a position closer to the rotation center of said gimbal than a position on said lower substrate with which said gimbal comes into contact when rotating.

8. A mirror device according to claim 7,
characterized in that said gimbal has a second projection, projecting along a radial direction of said gimbal, at an edge thereof.

9. A mirror device according to claim 8,
characterized in that said second projection has the same potential as that of said mirror and said gimbal.

10. A mirror device according to claim 1,
characterized by further comprising an insulating member which is disposed at a position on said lower substrate with which one of said mirror and said gimbal comes into contact when rotating.

11. A mirror device according to claim 1,
characterized by further having a conductive member which is disposed at a position on said lower substrate with which one of said mirror and said gimbal comes into contact when rotating and which has the same potential as that of said mirror and said gimbal.

12. A mirror device according to claim 1,
characterized in that said upper substrate comprises an Silicon on Insulator (SOI) substrate comprising a silicon base portion having a mirror formation region, a buried insulating layer formed on said base portion, and a silicon layer formed on said buried insulating layer, and includes a base formed in said mirror formation region and said mirror rotatably connected to said base through a pair of connectors, and a projecting structure formed on said mirror in said silicon layer.

13. A mirror device according to claim 12,
characterized in that said projecting structure is arranged at a center of said mirror.

14. A mirror device according to claim 12,
characterized in that said projecting structure is arranged on a periphery of said mirror.

15. A mirror device according to claim 14,
characterized in that a plurality of projecting structures are arranged around said mirror.

16. A mirror device according to claim 12,
characterized by further comprising an insulating portion formed on said projecting structure.

* * * * *

UNITED STATES PATENT AND TRADEMARK OFFICE
CERTIFICATE OF CORRECTION

PATENT NO. : 7,978,388 B2
APPLICATION NO. : 12/086222
DATED : July 12, 2011
INVENTOR(S) : Shingo Uchiyama et al.

It is certified that error appears in the above-identified patent and that said Letters Patent is hereby corrected as shown below:

In the Claims, Column 21, Claim 4, line 16, please delete "hen" and insert -- when --.

Signed and Sealed this
Twenty-eighth Day of February, 2012

David J. Kappos
*Director of the United States Patent and Trademark Office*